(12) United States Patent
Enqvist

(10) Patent No.: US 12,313,797 B2
(45) Date of Patent: May 27, 2025

(54) SYSTEMS AND METHODS FOR DETECTING SOURCES OF PARTICLE EMISSIONS

(71) Applicant: University of Florida Research Foundation, Inc., Gainesville, FL (US)

(72) Inventor: Per Andreas Jon Enqvist, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 0 days.

(21) Appl. No.: 17/773,162

(22) PCT Filed: Oct. 29, 2020

(86) PCT No.: PCT/US2020/057855
§ 371 (c)(1),
(2) Date: Apr. 29, 2022

(87) PCT Pub. No.: WO2021/087040
PCT Pub. Date: May 6, 2021

(65) Prior Publication Data
US 2024/0184001 A1    Jun. 6, 2024

Related U.S. Application Data

(60) Provisional application No. 62/927,530, filed on Oct. 29, 2019.

(51) Int. Cl.
*G01T 1/29*     (2006.01)
*G08B 21/18*    (2006.01)

(52) U.S. Cl.
CPC .............. *G01T 1/29* (2013.01); *G08B 21/182* (2013.01)

(58) Field of Classification Search
CPC ........ G01T 1/29; G01T 1/2907; G08B 21/182
See application file for complete search history.

(56) References Cited

U.S. PATENT DOCUMENTS

| 10,191,160 B1 | 1/2019 | Newman |
| 2008/0157986 A1 | 7/2008 | Proctor |
| 2016/0095560 A1 | 4/2016 | Tobisha |

OTHER PUBLICATIONS

International Search Report for PCT/US20/057855 mailed Jan. 26, 2021.

(Continued)

*Primary Examiner* — David P Porta
*Assistant Examiner* — Gisselle M Gutierrez
(74) *Attorney, Agent, or Firm* — Thomas | Horstemeyer, LLP

(57) ABSTRACT

A system and method for detecting radiological sources with improved accuracy. The system comprises at least a first radiological sensor, at least a first three-dimensional (3-D) sensor and processing logic. The first radiological sensor detects radiation emitted by a radiological source and outputs a radiation count rate. The 3-D sensor detects distance of a moving carrier of the radiological source from the radiological sensor and outputs a 3-D sense signal containing first distance domain information. The processing logic is configured to perform a data-fusion algorithm that converts the radiation count rate into second distance domain information and combines the second distance domain information with the first distance domain information to obtain fused data. The datafusion algorithm compares the fused data with a threshold value to determine whether the detected radiation is a true positive or corresponds to background radiation.

20 Claims, 18 Drawing Sheets

(56) References Cited

OTHER PUBLICATIONS

Stadnikia, et al., "Data-fusion for a vision-aided radiological detection system: Senor dependence and Source Tracking", EPJ Web Conferences 170, ANIMMA, 2017 (Jan. 2018).

Stadnikia, et al., "Data fusion for a vision aided radiological detection system: Calibration algorithm performance", Nuclear instruments and methods in physics research section A: Accelerators, spectrometers, detectors and associated equipment 890, May 2018.

Table I. Detection Method Comparison for Combined Radiological Data

| Detection Method | True Positives | | |
|---|---|---|---|
| | 300cm | 500cm | 700cm |
| Net Signal | 99.31% | 7.67% | 0.48% |
| Gaussian fit | 100.00% | 87.49% | 23.75% |
| Rational fit | 100.00% | 86.75% | 22.58% |

FIG. 11

Table II. Detection Method Comparison for Neutron Only Radiological Data

| Detection Method | True Positives | | |
|---|---|---|---|
| | 300cm | 500cm | 700cm |
| Net Signal | 100.00% | 84.58% | 25.55% |
| Gaussian fit | 100.00% | 99.39% | 79.89% |
| Rational fit | 100.00% | 99.33% | 78.88% |

FIG. 13

Table III. Detection Method Comparison for Gamma-ray Only Radiological Data

| Detection Method | True Positives | | |
|---|---|---|---|
| | 300cm | 500cm | 700cm |
| Net Signal | 76.98% | 1.74% | 0.18% |
| Gaussian fit | 99.97% | 47.43% | 6.17% |
| Rational fit | 99.97% | 46.06% | 6.00% |

FIG. 14

SYSTEMS AND METHODS FOR DETECTING SOURCES OF PARTICLE EMISSIONS

CROSS-REFERENCE TO RELATED APPLICATIONS

This application is a national stage entry pursuant to 35 U.S.C. § 371 of Patent Cooperation Treaty (PCT) international application No. PCT/US2020/057855 filed on Oct. 29, 2020 which claims priority to, and the benefit of the filing date of, U.S. provisional application No. 62/927,530, filed on Oct. 29, 2019, entitled "SYSTEMS AND METHODS FOR DETECTING SOURCES OF PARTICLE EMISSIONS" which are all hereby incorporated herein by reference in its entirety their entireties.

TECHNICAL FIELD

The present disclosure relates to a system and method for detecting sources of particle emissions.

BACKGROUND

Nuclear terrorism is a genuine threat realized throughout the entire world. Areas of concern include, airports, seaports, border crossings, and package and mail facilities, hospitals and universities. Detection of a radiological threat in these busy, dynamic environments is important but incredibly difficult. High traffic areas populated by people, bags, boxes and vehicles create challenging scenarios and often require chokepoints as seen in airport security. When a radiation detection system alarms, whether by a true threat or by natural fluctuations, it can significantly and negatively impact the flow of people and commerce.

Aside from the intentional smuggling of radiological material, legitimate and accidental transport occurs as well. Radiological material accountability at sites, such as nuclear facilities and universities, where nuclear material is allowed and expected to be transported, is regulated and inventoried, but could also be monitored. While it is not often discussed, insider threats also remain a possibility. Orphan sources in the hands of the unaware also pose a health threat and could lead to harm. Currently, the U.S. government has deployed radiation portal monitors (RPMs) to address the threat of trafficked radiological materials. Particles emitted by radiological materials will interact in the RPMs and be detected.

Nuclear material emits many types of radiation. Some of the common types are alpha particles, beta particles, gamma-rays, and neutrons. Depending on the material, the particles will be emitted with different energies and can travel through the air to be detected. However, the range of an alpha particle through air is only a few centimeters, and the range of a beta particle is only a few meters. This makes relying on the detection of these particles impractical for the problem being discussed. Thus, the focus lies on the detection of gamma-rays and neutrons, which can travel several meters in air. However, the nuclear material of concern is not the only material that emits radiation.

Cosmic radiation, terrestrial radiation, and Radon gas make up a majority of what is known as background radiation. Background radiation is the naturally occurring ionizing radiation found in a particular environment, which varies by location and in time. This variation is due to a multitude of factors such as weather, geology, cosmic fluxes and altitude. Laboratory detectors can be shielded from background radiation; however, detecting background radiation in field detectors is unavoidable. Therefore, the level of background radiation should be well known and steps should be taken to compensate for it.

The contribution from background gamma-ray radiation is usually significantly higher than the contribution from background neutron radiation. Uranium and Thorium found all throughout the Earth's crust are constantly decaying. When these isotopes decay, they release radiation in many forms. Most importantly, they release a significant amount of gamma-rays which causes the gamma-ray background to be much higher than the neutron background. The naturally occurring neutrons come from interactions of high energy cosmic particles, such as protons and alpha particles, which produce spallation neutrons when interacting with molecules in the Earth's atmosphere. The detected background is often used to set an alarm level.

An alarm level or detection limit is a decision threshold for distinguishing between radiation from the background and radiation from a source. For many detection systems, the alarm level is typically set to five standard deviations above the expected background. When the count rate exceeds the set detection limit, the system will trigger an alarm indicating the possible presence of unwanted nuclear material. Generally, there are three types of alarms: false alarms, nuisance alarms, and threat alarms. Threat alarms, or true alarms, are when the detection system alarms and unwanted nuclear material was found. It would be ideal for a system to have no false alarms and no nuisance alarms.

False alarms are when the system alarms, but there is no radioactive material present. These are also known as false positives. An alarm level set high enough to minimize the false positives, but kept low enough to reduce the possibility of missing the presence of a true threat (true positive), can be optimized. There is a trade-off between the false positive rate and true positive rate when determining an alarm level, and optimization depends on a number of factors.

Nuisance alarms are when the system alarms, there is radioactive material present, but the material is not a threat. These alarms are common in RPM's. There are many materials that emit radiation other than those comprised in the background. Large amounts of cat litter and even nuclear diagnostics patients have triggered Nuisance alarms of RPM's. The U.S. has deployed over a thousand RPMs domestically, so reducing non-threat alarms would save substantial time, money and resources.

Annually, hundreds of thousands of RPM alarms occur resulting in tens of thousands of hours of CBP personnel work and consuming millions of dollars processing non-threat alarms. Responding to frequent false alarms causes the perceived reliability of the system to decrease. Operators may then begin to lose trust in the system, and the loss of trust can result in delayed response and even failure to respond altogether. Developing a system that could reduce the number of chokepoints and false alarms would save a significant amount of time and money.

Ultimately, a system that can efficiently and effectively detect trafficked radiological materials, whether accidental or intentional, is needed to aid in the goals of non-proliferation. Current technology faces many challenges when considering the ability to maintain the flow of commerce and people and to rapidly sort out false alarms from true alarms, therefore, leaving room for improvement or new systems. Nuclear security systems are also not a one size fits all solution. While RPMs may be sufficient for many applications, they are not necessarily suitable for all purposes.

SUMMARY

The present disclosure is directed to a system and method for detecting sources of particle emissions. The system comprises at least a first particle emission detector, at least a first spatial information sensor and processing logic. The first particle emission detector detects particles emitted by particle-emitting sources and outputs detector output signals corresponding to particle emission count rates. The first spatial information sensor senses spatial information relating to movement of moving carriers over time relative to a location of the first particle emission detector and outputs sense signals containing first spatial domain information. The processing logic receives a particle emission count rate and the first spatial domain information. The processing logic is configured to perform a data-fusion algorithm that fuses information obtained from the particle emission count rate with the first spatial domain information and determines whether a moving carrier is carrying a particle-emitting source based at least in part on the fused information.

In accordance with a representative embodiment, the information obtained from the particle emission count rate comprises second spatial domain information obtained by the data-fusion algorithm by converting the received particle emission count rate into second spatial domain information, and wherein the data-fusion algorithm comprises a correlation algorithm and a detection algorithm, the correlation algorithm correlating the first spatial domain information with the second spatial domain information to determine whether a moving carrier correlates to the particle emission count, the detection algorithm determining whether the received particle emission count rate indicates that a particle-emitting source has been detected by the detection algorithm.

In accordance with a representative embodiment, the first particle emission detector is a first radiation detector that detects radiation emitted by radiological sources and outputs radiation count rates. The particle-emitting sources are radiological sources, and the data-fusion algorithm converts the received radiation count rate into said second spatial domain information.

In accordance with a representative embodiment, the first spatial information sensor comprises a first three-dimensional (3-D) sensor that detects a distance of a moving carrier over time relative to the location of the first particle emission detector. In accordance with this embodiment, the first spatial domain information comprises the distance of a moving carrier over time relative to the location of the first particle emission detector, and the second spatial domain information comprises the distance of a moving carrier over time relative to the location of the first particle emission detector.

In accordance with a representative embodiment, the correlation algorithm uses a correlation threshold (TH) value to determine an extent of correlation between the first and second spatial domain information, and the detection algorithm uses a detection limit TH value to determine whether the received particle emission count rate indicates that a particle-emitting source has been detected by the detection algorithm.

In accordance with a representative embodiment, the detection algorithm operates to provide a primary alarm and the correlation algorithm operates to provide a secondary alarm such that if the detection algorithm determines that the received particle emission count rate has exceeded the detection limit TH value thereby indicating that the received particle emission count rate indicates that a particle-emitting source has been detected, the primary alarm occurs. When the primary alarm occurs, the correlation algorithm determines which moving carrier has a highest correlation to the particle emission count rate that exceeded the detection limit TH value and causes the secondary alarm to occur.

In accordance with a representative embodiment, the correlation algorithm is selected from a group comprising a Cosine Distance Method algorithm, a Correlation Coefficient Method algorithm, a Noise Deviation Method algorithm and a Non-negative Least Squares (NNLS) Method algorithm.

In accordance with a representative embodiment, the detection limit TH value is set based at least in part on a preselected false positive rate that the system is to achieve.

In accordance with a representative embodiment, the detection algorithm sets the detection limit TH value by performing a fit algorithm that fits a preselected curve function to a multiplicity of the detector output signals to obtain a multiplicity of fits and then sets the detection limit TH value based on the multiplicity of fits.

In accordance with a representative embodiment, after the detection limit TH value is set by performing the fit algorithm, the detection algorithm determines whether the particle emission count rate has exceeded the detection limit TH value thereby indicating that a particle-emitting source has been detected and causing the primary alarm to occur.

In accordance with a representative embodiment, after the detection algorithm sets the detection limit TH value, the detection algorithm revises the detection limit TH value by performing the fit algorithm on a multiplicity of the detector output signals to obtain a multiplicity of fits and then revises the detection limit TH value based on the multiplicity of fits.

In accordance with a representative embodiment, the fit algorithm is selected from a group comprising a Gaussian Fit Method algorithm and a Rational Fit Method algorithm.

In accordance with a representative embodiment, the system further comprises at least a second particle emission detector that detects particles emitted by particle-emitting sources and outputs detector output signals corresponding to particle emission count rates, and at least a second spatial information sensor located in a preselected location relative to the first particle emission detector and the first spatial information sensor. The second spatial information sensor senses spatial information relating to movement of moving carriers over time relative to a location of the first particle emission detector and outputs sense signals containing the first spatial domain information. The processing logic receives particle emission count rates output by the first and second particle emission detectors and the first spatial domain information output by the first and second spatial information sensors and fuses information obtained from the particle emission count rates with the first spatial domain information. The processing logic determines whether a first moving carrier or a second moving carrier is carrying a particle-emitting source based at least in part on the fused information.

In accordance with a representative embodiment, the method for detecting sources of particle emissions comprises:
 with at least a first particle emission detector, detecting particles emitted by particle-emitting sources and outputting detector output signals corresponding to particle emission count rates;
 with at least a first spatial information sensor that senses spatial information relating to movement of moving carriers over time relative to a location of the first particle emission detector and outputting sense signals containing first spatial domain information;
 receiving a particle emission count rate and the first spatial domain information in processing logic; and in the processing logic, performing a data-fusion algorithm that fuses information obtained from the received particle emission count rate with the received first spatial domain information and determining whether a moving carrier is carrying a particle-emitting source based at least in part on the fused information.

In accordance with a representative embodiment, the information obtained from the particle emission count rate comprises second spatial domain information obtained by the data-fusion algorithm by converting the received particle emission count rate into second spatial domain information. In accordance with a representative embodiment, the data-fusion algorithm comprises a correlation algorithm and a detection algorithm. The correlation algorithm correlates the first spatial domain information with the second spatial domain information to determine whether a moving carrier correlates to the particle emission count. The detection algorithm determines whether the received particle emission count rate indicates that a particle-emitting source has been detected by the detection algorithm.

In accordance with a representative embodiment of the method, the first particle emission detector is a first radiation detector that detects radiation emitted by radiological sources and outputs radiation count rates. In accordance with a representative embodiment, the particle-emitting sources are radiological sources and the data-fusion algorithm converts the received radiation count rate into the second spatial domain information.

In accordance with a representative embodiment of the method, the first spatial information sensor comprises a first 3-D sensor that detects a distance of a moving carrier over time relative to the location of the first particle emission detector. The first spatial domain information comprises the distance of a moving carrier over time relative to the location of the first particle emission detector. The second spatial domain information comprises the distance of a moving carrier over time relative to the location of the first particle emission detector.

In accordance with a representative embodiment of the method, the correlation algorithm uses a correlation TH value to determine an extent of correlation between the first and second spatial domain information, and the detection algorithm uses a detection limit TH value to determine whether the received particle emission count rate indicates that a particle-emitting source has been detected by the detection algorithm.

In accordance with a representative embodiment, the detection algorithm sets the detection limit TH value by performing a fit algorithm that fits a preselected curve function to a multiplicity of the detector output signals to obtain a multiplicity of fits and then sets the detection limit TH value based on the multiplicity of fits. After the detection limit TH value is set by performing the fit algorithm, the detection algorithm determines whether the particle emission count rate has exceeded the detection limit TH value thereby indicating that a particle-emitting source has been detected, and if so, causes the primary alarm to occur. After the detection algorithm sets the detection limit TH value, the detection algorithm revises the detection limit TH value by performing the fit algorithm on a multiplicity of the detector output signals to obtain a multiplicity of fits and then revises the detection limit TH value based on the multiplicity of fits.

In accordance with a representative embodiment, a computer program is provided for detecting sources of particle emissions. The computer program is embodied on a non-transitory computer readable medium and comprises computer instructions for execution by processing logic. The computer program comprises first, second and third computer code portions. The first computer code portion receives a particle emission count rate from at least a particle emission detector that detects particles emitted by particle-emitting sources and outputs detector output signals corresponding to particle emission count rates. The second computer code portion receives first spatial domain information from at least a first spatial information sensor that senses spatial information relating to movement of moving carriers over time relative to a location of the first particle emission detector and outputs sense signals containing the first spatial domain information. The third computer code portion performs a data-fusion algorithm that fuses information obtained from the particle emission count rate received by the first computer code portion with the first spatial domain information received by the second computer code portion and determines whether a moving carrier is carrying a particle-emitting source based at least in part on the fused information.

These and other features and advantages are described below with reference to the description, drawings and claims.

BRIEF DESCRIPTION OF THE DRAWINGS

FIG. 11 is an ROC curve comparison plot of signal to background ratios based on particle type at a distance of 700 cm to the detector at the apex for all methods.

FIGS. 13 and 14 show percent of threats detected for an individual walking past the radiological detector carrying a radioactive source.

FIG. 19 is a flow diagram representing the method performed by the system in accordance with a representative embodiment for detecting sources of particle emissions.

DETAILED DESCRIPTION

Figure 1:
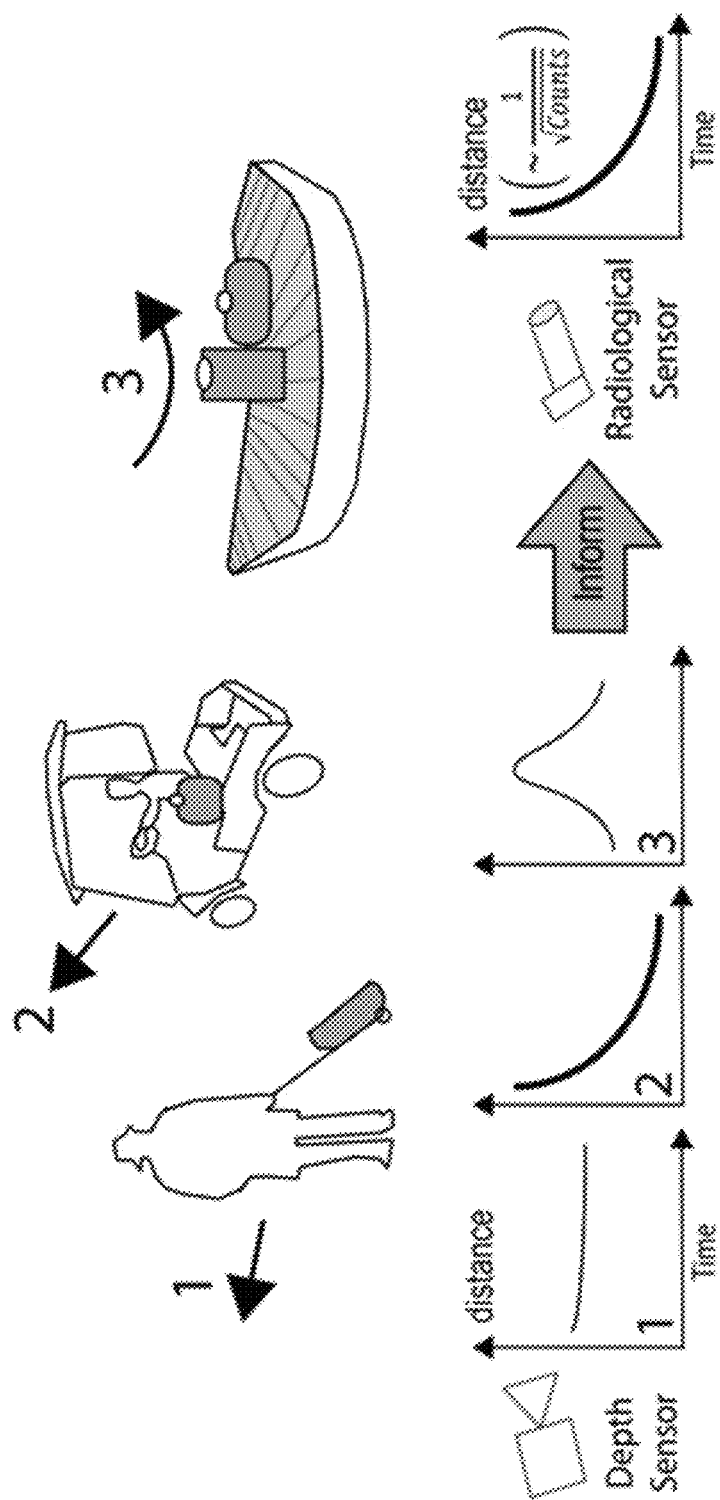
FIG. 1 is a diagram illustrating the data-fusion concept based on the radiological and 3-D vision sensors in accordance with a representative embodiment.

The present disclosure discloses a system and method for detecting sources of particle emissions. The system comprises at least a first particle emission detector, at least a first spatial information sensor and processing logic. The first particle emission detector detects particles emitted by particle-emitting sources and outputs detector output signals corresponding to particle emission count rates. The first spatial information sensor senses spatial information relating to movement of moving carriers over time relative to a location of the first particle emission detector and outputs sense signals containing first spatial domain information. The processing logic receives a particle emission count rate and the first spatial domain information. The processing logic is configured to perform a data-fusion algorithm that fuses information obtained from the received particle emission count rate with the received first spatial domain information and determines whether a moving carrier is carrying a particle-emitting source based at least in part on the fused information.

In accordance with a preferred embodiment, the first particle emission detector is a first radiological detector and the first spatial information sensor is a first three-dimensional (3-D) sensor.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," "processing device," or "processing logic," as those terms are used herein encompass an electronic component that is able to execute a computer program or executable computer instructions. References herein to a system comprising "a processor," "a processing device," or processing logic should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

Developments and improvements in the three-dimensional (3-D) vision community have provided many feasible options to beneficially incorporate 3-D vision sensors into radiological detection systems. The addition of a 3-D vision sensor to a radiological detection system is advantageous for several reasons. Vision sensors provide a priori information allowing for a more sophisticated detection system. Context from scene information, such as visual occlusions and average velocity of a tracked object, for example, can be valuable. Most importantly, through object tracking via the vision sensor, a system can be devised that not only accurately detects nuclear material, but that also can track it.

Technologies such as portal monitors and distributed sensor networks attempt to tackle the same issue (without the use of vision aid) that the system of the present disclosure aims to address. All of these systems require a detection threshold, which is typically set at five standard deviations above expected background count rates. Non-threat alarms frequently occur in these systems. False alarms occur from natural background exceeding the set threshold and nuisance alarms occur from naturally occurring radioactive material (NORM). As indicated above, these non-threat alarms consume significant time and money. New algorithms, radiation detectors and techniques have been researched to address this issue. Embodiments of methods presented in the present disclosure show significant improvements in the detection threshold by using information provided by a 3-D vision sensor.

The Microsoft Kinect and the Velodyne sensors are two well-known examples of 3-D vision sensors. The Velodyne sensor uses a Near Infrared (IR) laser to create a map of its surrounding in 3-D. This is referred to as Light Detection and Ranging (LiDAR) technology, which measures distances using Time-of-Flight (TOF) and short laser pulses. The Kinect sensor emits IR light beams and reads the reflected IR beams with a depth sensor. The beams are converted to provide depth information measuring the distance between an object and the sensor. This technology is then capable of outputting the trajectories of moving objects in distance over time.

In accordance with a representative embodiment, in order to fuse the 3-D vision sensor data stream to the radiological sensor data stream, the count rate measured by the radiological sensor is first converted to a distance domain. The count rate conversion can be based on the inverse-square law for simplicity. The inverse square law states that the count rate is inversely dependent on the square of the distance between the radiological sensor and the radiation source. FIG. 1 shows the data-fusion concept comparing the 3-D vision sensors trajectories over time of three moving objects to the radiological sensors count rate over time converted to the distance domain.

3-D vision technology has enabled situations where a more sophisticated detection limit algorithm can be devised. It is known that a concise definition and framework for a stationary detection limit ($L_C$) can be expressed as given below in equation 1:

$$L_C = k_0 \sigma_{N_S}' \quad (1)$$

where $k_0$ is the desired standard deviation from the mean of the standard normal distribution and $\sigma_{N_S}$ is the standard deviation of the net signal under the conditions where no real activity is present. This method of detection is limiting for a system in dynamic environments as it does not take into account situational awareness and additional scene information. The present disclosure demonstrates how the information obtainable from a 3-D vision sensor can improve the ability to detect nuclear threats.

1. Methods

Utilizing information from a 3-D vision sensor can provide information such as the distance from a moving object to the radiological detector and the average speed of an object in motion. The radiological detector response follows a specific trend at certain times and the relative radiological source strength at any given time interval is well known assuming the inverse square law. Synthetic data was created based on experimental data that utilized a Cf-252 radiological source (approximately 90 µCi), which emits approximately 358,000 neutrons/second and an EJ-309 liquid scintillator radiological detector.

Synthetic Data

Figure 2:
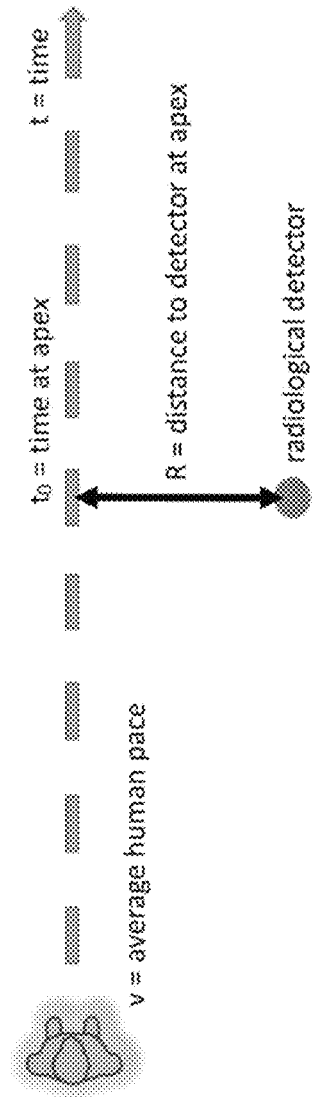
FIG. 2 is a schematic that depicts the assumed object trajectory for the creation of synthetic data.

In order to examine the ability of a revised detection limit that utilizes 3-D vision, synthetic data was created to emulate experimental data. FIG. 2 is a schematic diagram that depicts the assumed object trajectory for the creation of the synthetic data. This is a simple case. In a real scenario, the path an object takes would be determined by the vision sensor. The shape of the path will determine the appropriate fit function and aid in the revision of the detection limit.

Figure 3:
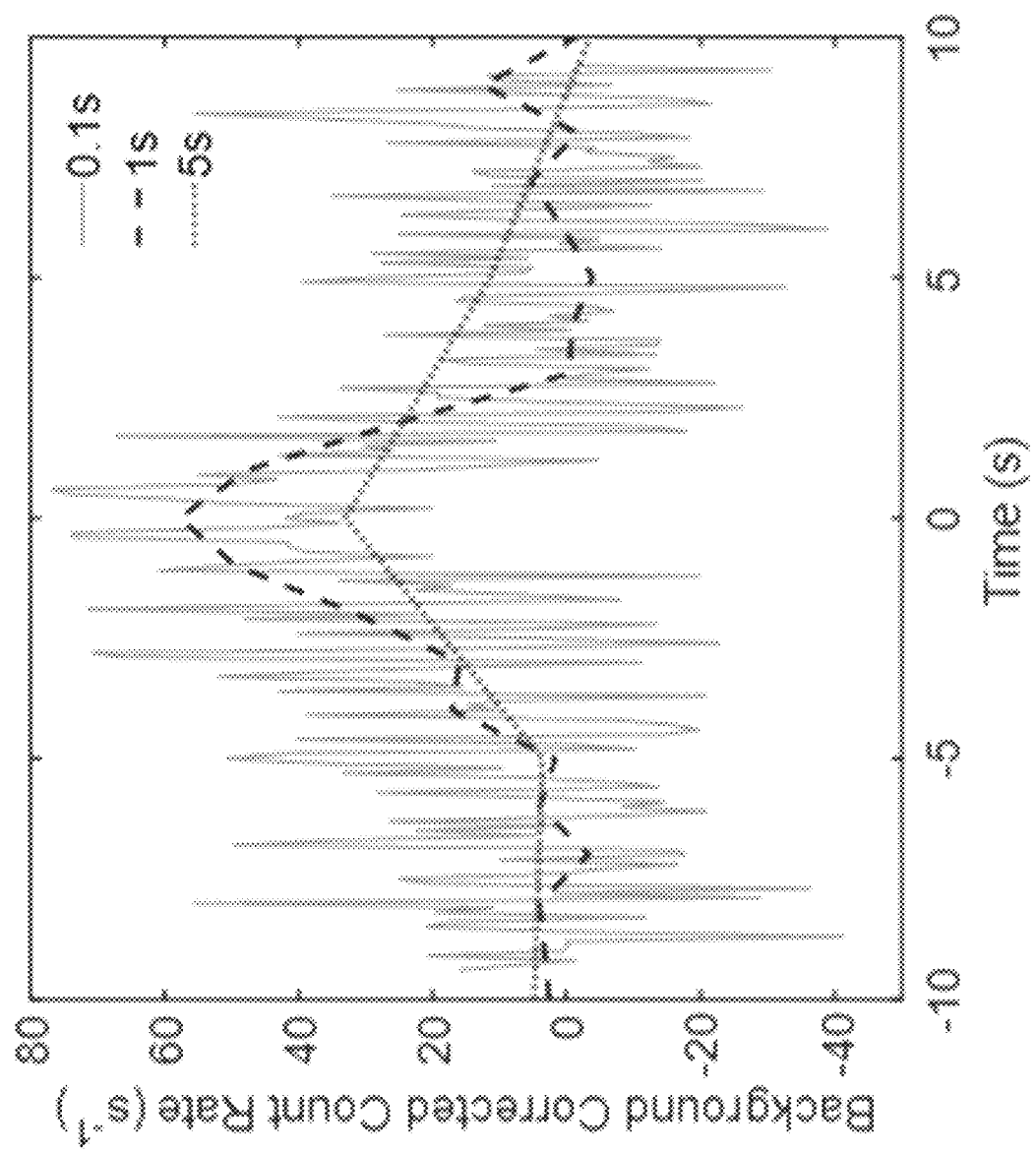
FIG. 3 is a plot of Net count rate trajectory comparison of time intervals at a 300 cm distance to the detector at the apex.
Figure 4:
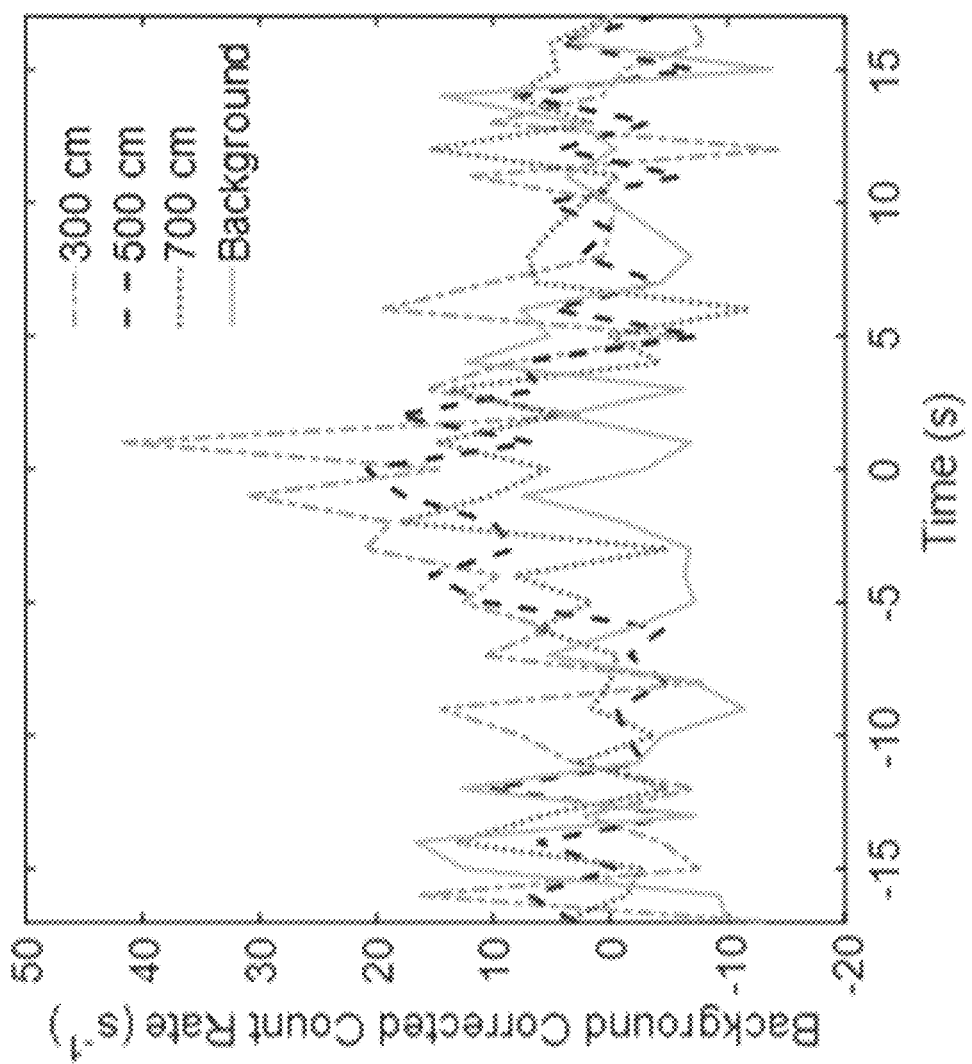
FIG. 4 is a plot of Net count rate trajectory comparison of distances at the apex using a 1 s time interval.

The variables shown in FIG. 2 for a straight path can be written into the rational equation 2 below, $$C = \frac{C_0}{R^2 + v^2(t - t_0)^2}. \quad (2)$$

where the parameter, C, is count rate, and $C_0$ is related to the source strength and was set based on the source strength of the Cf-252 and the background count rate in experimental measurements (~38 cps combined gamma-ray and neutron data at 300 cm background corrected). R is the closest distance the tracked object (or source) gets to the detector during the measurement period, to is the time at which the source reaches this apex, v is the average human pace (1.4 meters per second) and/is the time. The variable $t_0$ was set to be 0 and R was chosen to be 300 cm, 500 cm and 700 cm. The proper count rate related Poissonian noise was added to the synthetic data. Several time intervals were also explored. An example of the time interval effects and distance at the apex (R) effects on the synthetic signals are shown in FIGS. 3 and 4, respectively. FIG. 3 shows that the data contains more statistical fluctuations when created with smaller time intervals while FIG. 4 shows the synthetic data signals for varying distances to the detector at the apex, R, compared with background. From FIG. 4, it can be seen that as the distance to the detector at the apex increases, the signal becomes less distinguishable from the background.

Figure 5:
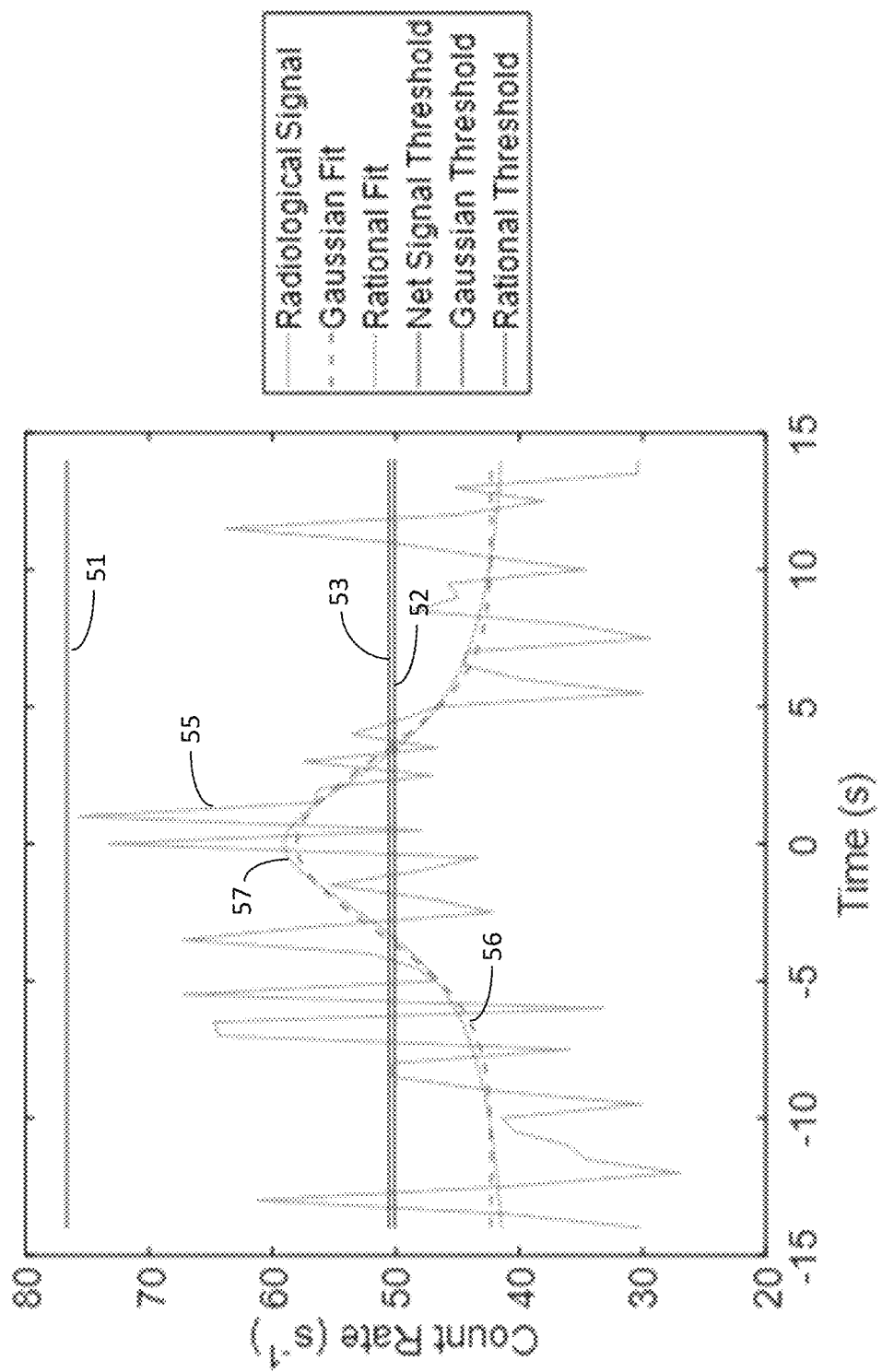
FIG. 5 is a comparison plot of three detection limit methods with background included and using a 0.01% false positive rate for the creation of the threshold; distance at the apex (R) was set to 500 cm, the time intervals was set to 0.5 s and combined gamma-ray and neutron detection rate data was used.
Figure 6:
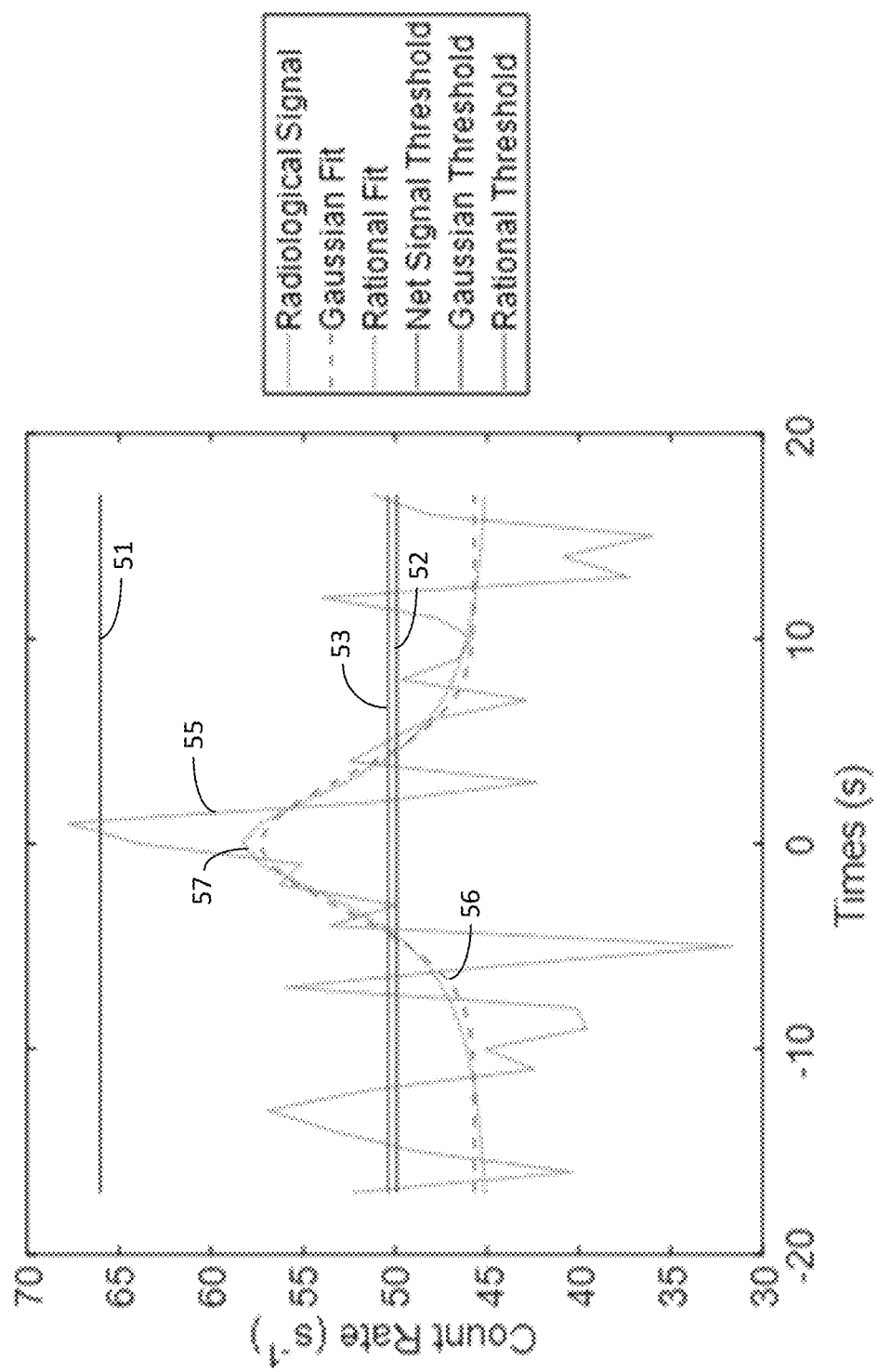
FIG. 6 is a comparison plot of the three detection limit methods with background subtracted and using a 1% false positive rate for the creation of the threshold; distance at the apex (R) was set to 500 cm, the time intervals was set to 1 s and combined gamma-ray and neutron data was used.

Three methods for detection were tested: the Net Signal, a Gaussian fit to the net signal (Gaussian Fit Method), and a rational fit, based on Eq. 2, to the net signal (Rational Fit Method). The Net Signal Method compares the maximum of the net signal to the detection threshold to determine the presence of a source. The detection threshold for the Net Signal Method is created using Eq. 1 and based on the desired false positive rate which sets $k_0$ of the equation. The amplitude of the fit functions used in the Gaussian and Rational Fit Methods is compared to the detection thresholds generated by their respective revised detection thresholds. Parameters for the Gaussian Fit and Rational Fit Methods, such as width and centroid, are set based on information provided by the 3-D vision sensor. The width is based on the average speed and the peak centroid is based on the point when the object being tracked reaches its closest (absolute minimum) distance to the radiological detector or the apex of the object's walk. The detection thresholds for the fit methods were created by fitting each equation (Gaussian and Rational) one million times to randomized background data segments taken from experimental measurements. The threshold was then chosen by sorting the amplitudes from fitting the background segments from lowest to highest and selecting the appropriate threshold based on the desired false positive rates. False positive rates of 30%, 20%, 10%, 1%, 0.1%, 0.01 and 0.001% were analyzed. FIG. 5 and FIG. 6 show examples of the count rate data over time with each of the detection limit methods and their respective thresholds for a 1 s time interval and combined radiological data. FIG. 5 shows the data with a 0.5 s time interval and FIG. 6 shows the data with a 1 s time interval. Lines 51, 52 and 53 correspond to the Net Signal threshold, the Gaussian Threshold and the Rational threshold, respectively. Curves 55, 56 and 57 correspond to the radiological signal, the Gaussina Fit and the Rational Fit, respectively.

Figure 7:
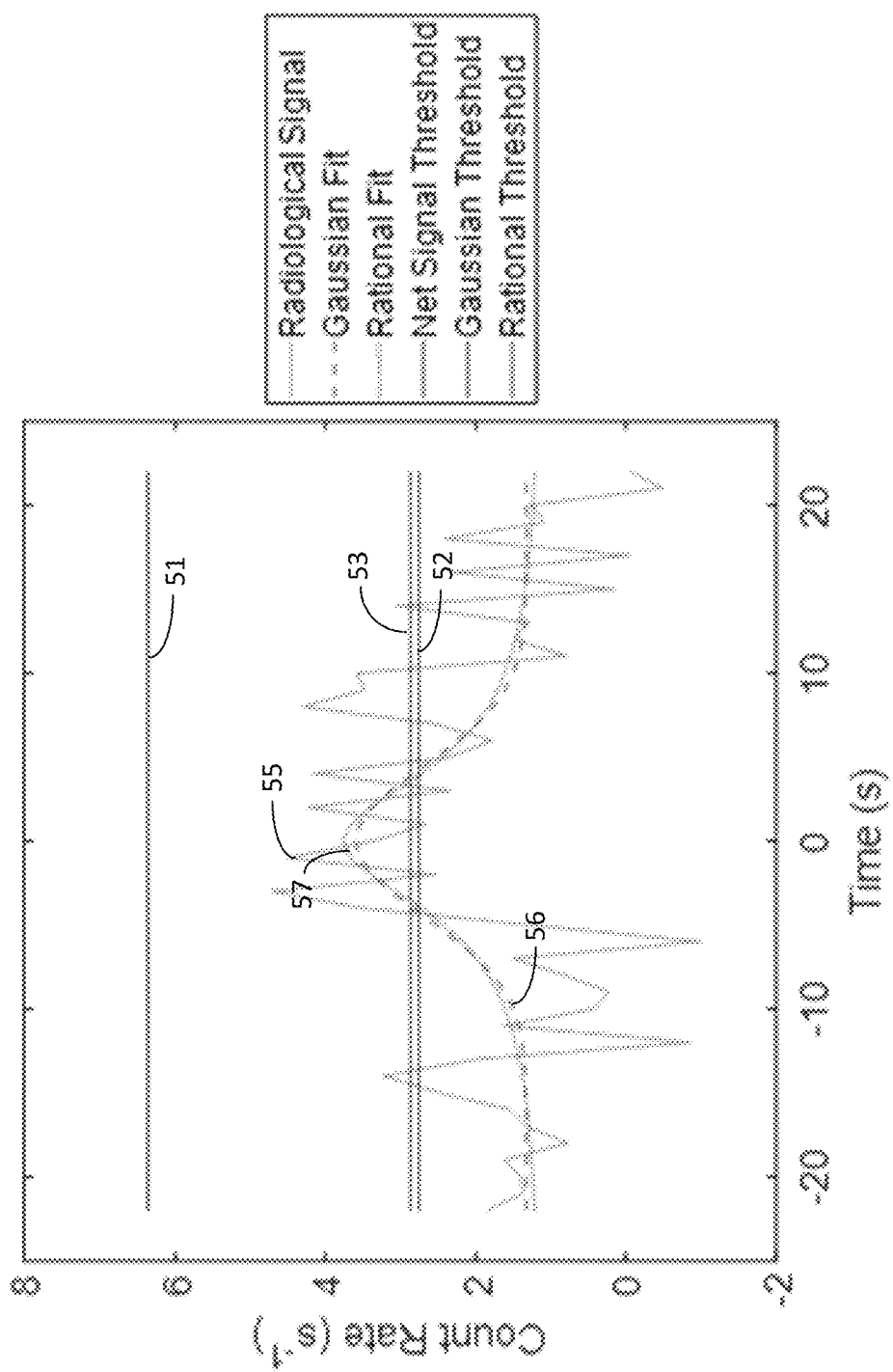
FIG. 7 is a comparison plot of the three detection limit methods with background subtracted and using a 0.01% false positive rate for the creation of the threshold; distance at the apex (R) was set to 700 cm, the time intervals was set to 1 s and neutron-only data was used.

The time intervals affect the statistic error of the data. Uncertainty at smaller time intervals causes significantly more noise. Signal to background ratio is another comparison that can be made by comparing different incoming particle types. Using a neutron emitting source, neutron only data would have a high signal to background ratio compared to gamma-ray only data due to the significantly lower neutron background compared to the gamma-ray background. From experimental data, the gamma-ray background count rate was approximately 42 cps and the neutron background count rate used was approximately 2 cps. The source strength based on the Cf-252 in experimental measurements at 500 cm was 13 cps background corrected and 5 cps background corrected for gamma-ray only data and neutron-only data, respectively. This gives a signal to background ratio (peak signal count rate divided by the square root of the average background rate) of 2.01 and 3.54 for gamma-ray only data and neutron only data at 500 cm. The signal to background ratio for combined data is 2.71 at 500 cm. FIG. 7 shows the methods vs. their respective thresholds for a 1 s time interval for neutron only radiological data.

Experimental Data

Figure 8:
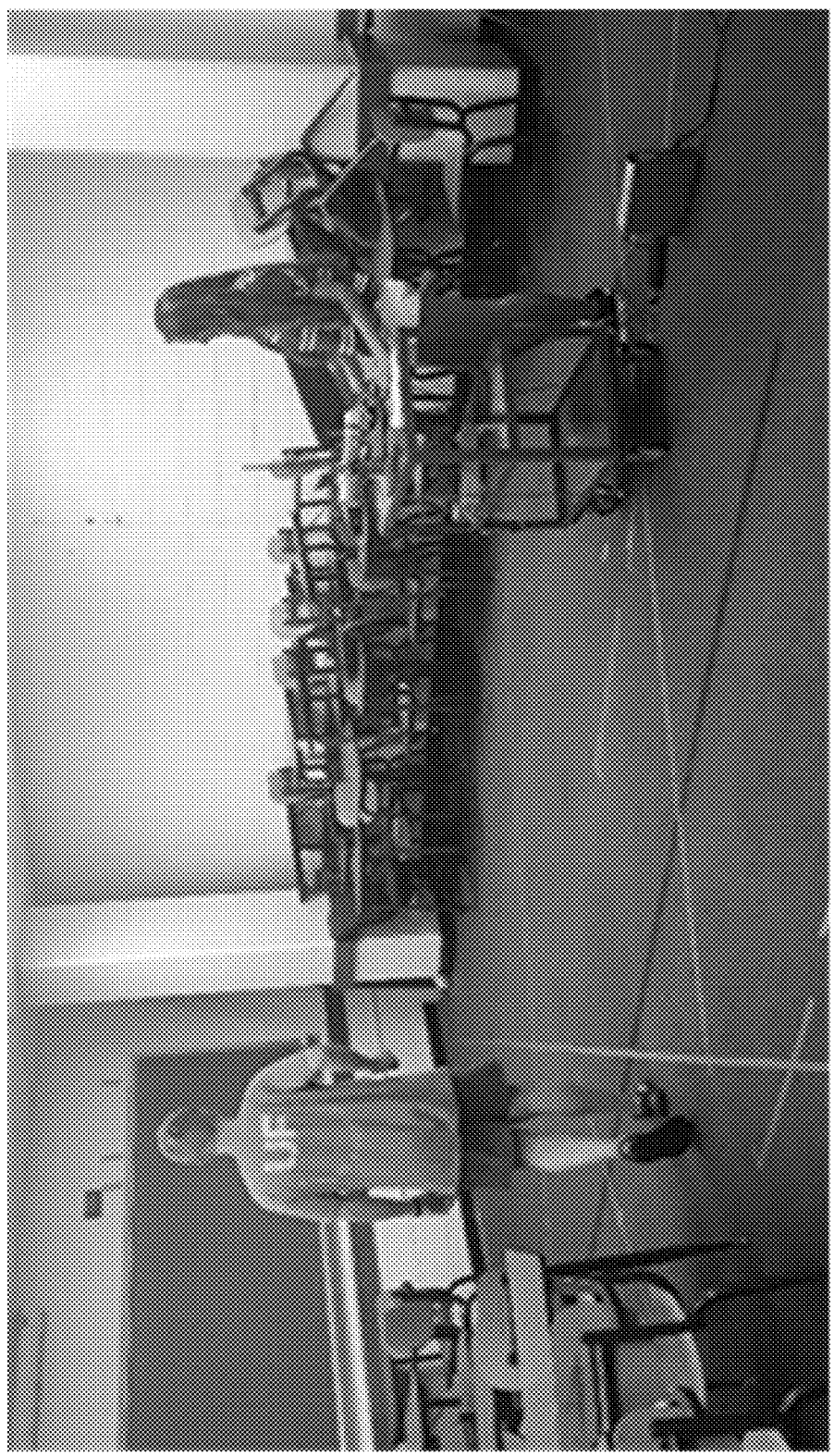
FIG. 8 is an image depicting laboratory measurements for revised Currie detection limits.

Laboratory measurements were taken to test the revised detection limits. Using a Cf-252 source and a 7.6×7.6 cm EJ-309 liquid scintillator detector, four measurements were taken where the distance to the detector at the apex was 100 cm, 200 cm, 300 cm, and 400 cm. The time intervals used were 0.1 s, 0.5 s, 1 s, and 2 s. FIG. 8 is an image of the measurements taken.

A long background measurement was taken to create the thresholds. Similar to the creation of the thresholds for the synthetic data, the threshold for the net signal method was created using Eq. 1. The thresholds for the fit methods were created by taking one million random segments of the background measurement and fitting them with each equation (Gaussian and Rational). Then the amplitudes of the fits were ordered from lowest to highest and the threshold was determined based on the false positive rates of 30%, 20%, 10%, 5%, 1%, 0.1%, 0.01%, and 0.001%.

The results show how the use of 3-D vision improves the detection capabilities especially when source counts are low. They also show the significance of increased signal to background ratio.

Synthetic Data

To compare the results of the synthetically created count rate data, Receiver Operator Characteristic (ROC) curves were examined. The ROC curve plots the true positive rate (TPR) vs. the false positive rate (FPR) at the six previously mentioned false positive rates (threshold settings). The area under the curve (AUC) measures the ability of the test to correctly classify trajectories with and without a radioactive source present. It is often used when a general measure of predictiveness is desired. The closer the ROC curve is to the upper left corner of the figure (0, 1), the better the method is at correctly classifying data. A linear ROC curve from (0, 0) to (1, 1) means the method will predict the correct answer 50% of the time and is considered a random guess. A curve below this linear line gives worse than random results. ROC curve analysis has been used previously to determine detector shape and volume impact on radiation portal monitors. Each point on the ROC curve represents a sensitivity (TPR)/specificity (FPR) pair corresponding to a particular decision threshold. Thus, the decision threshold can be set based on the desired criteria of the system.

Figures 9A, 9B:
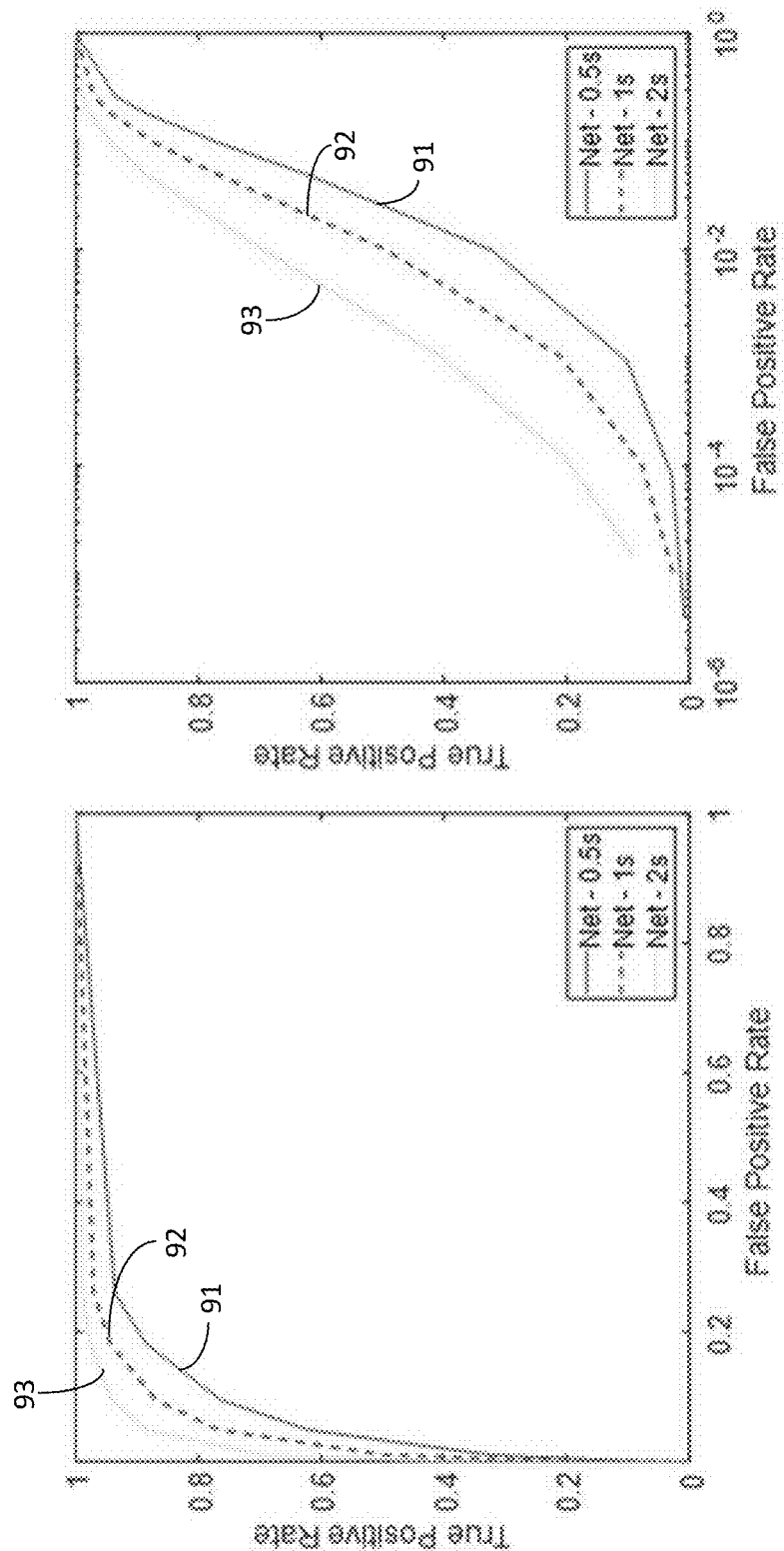
FIGS. 9A and 9B are ROC curve comparison plots of time intervals at a distance to the detector at the apex of 500 cm for the Net Signal Method where, respectively, the x-axis is in a linear scale and the x-axis is in log scale.

FIGS. 9A and 9B are plots of the ROC curve for the Net Signal Method for varying time intervals at a distance to the detector at an apex of 500 cm. FIG. 9A shows the traditional shape of the ROC curve. FIG. 9B is the same plot as FIG. 9A, except that the x-axis is changed to a log scale in FIG. 9B to show the trends of the curves and more desirable false positive rates for the method and system of the present disclosure. In FIGS. 9A and 9B, curves 91, 92 and 93 correspond to, respectively, time intervals of 0.5 s, 1.0 s and 2.0 s. The remaining ROC curve figures will be plotted with the x-axis in log scale. Since the false positive rates tested ranged from 0 to 30%, the ROC curve beyond 30% lacks data and dissymmetry can be seen in some of the curves. It is not expected that a false positive rate over 30% would be useful, and symmetry in the ROC curve can be expected for false positive rates beyond 30%. Only the Net Signal Method was shown for this comparison because the Gaussian Fit Method and the Rational Fit Method were unaffected by varying time intervals.

Larger time intervals show an improvement in detection capabilities for the Net Signal Method and show no clear trend for the Fit Methods. The chosen time interval would need to be one low enough such that a trend in the data could still be fit by one of the equations (Gaussian or Rational) and large enough that the influence of noise would not affect the results. At closer distances, the time interval can be lower since the signal from the source is significant. At further distances the signal is more difficult to discern from background and therefore, a larger interval is optimal since it reduces statistical noise.

Figure 10:
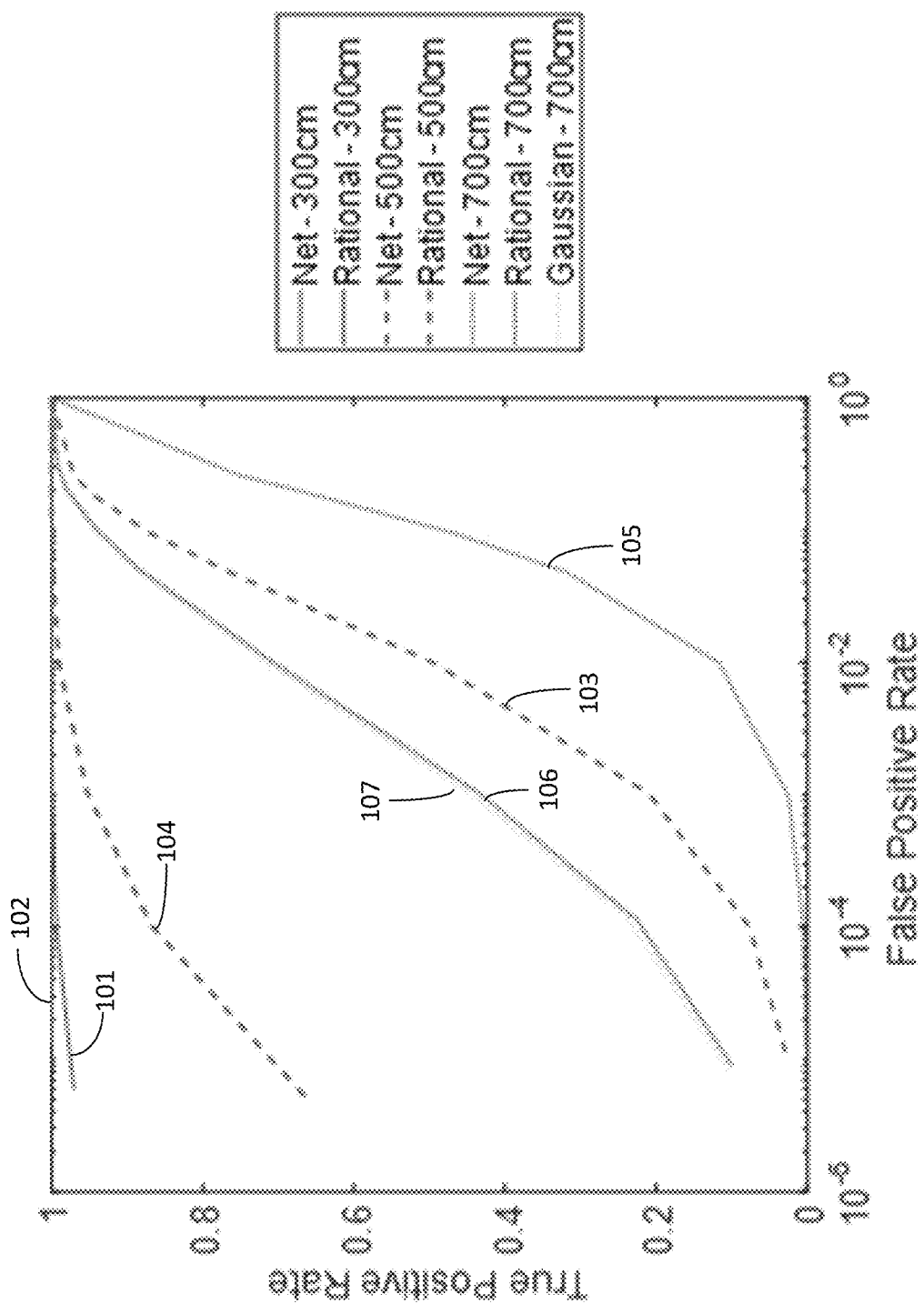
FIG. 10 is an ROC curve comparison plot of varying distances at the apex using 1 s time intervals for all methods.

FIG. 10 is a plot of the ROC curve for each of the methods for 1 s time intervals and varying distances to the detector at the apex. In FIG. 10, curves 101-107 correspond, respectively, to Net signal at 300 cm, Rational Fit at 300 cm, Net Fit at 500 cm, Rational Fit at 500 cm, Net Signal at 700 cm, Rational Fit at 700 cm and Gaussian Fit at 700 cm. The Gaussian Fit Method is only shown for a distance of 700 cm because the Gaussian Fit Method and Rational Fit Method are similar enough that they nearly overlap. Therefore, the Gaussian Fit Method will not be shown in the remaining figures. As shown in FIG. 10, the distance to the detector at the apex has a significant effect on the ROC curve. The results of FIG. 10 show that there is no significant difference in the ability of each method to predict the presence of a source at closer distances such as 300 cm. At 300 cm, source vs. no source scenarios were correctly predicted nearly 100% of the time; therefore, the ROC curve follows the top of the ROC space almost perfectly. However, at greater distances, the Net Signal Method's (curve 105) ability to predict the presence of a source begins to worsen compared to the Gaussian Fit (curves 107) and Rational Fit (curve 106) Methods. The AUC values at 300 cm are 1.00, 1.00 and 1.00 for the Net Signal Method, Gaussian Fit Method and Rational Fit Method, respectively. These values indicate that each of the methods are capable of predicting the presence or absence of a radioactive source accurately. The AUC values at 700 cm are 0.78, 0.97 and 0.97 for the Net Signal Method, Gaussian Fit Method and Rational Fit Method, respectively. These values indicate that the Fit Methods perform equally well while the Net Signal Method has begun to notably lose its ability to correctly classify the presence or absence of a radioactive source.

As an example, to further quantify the results, a situation was stipulated where an individual walks past the radiological detector carrying a radioactive source based on the Cf-252 source mentioned previously. The conditions are as follows: the person walked at the average human pace, 1.4 m/s; the apex of his walk was at 300 cm, 500 cm and 700 cm; and the system's detection threshold was set to have a false positive rate of 0.01%. FIG. 11 shows a table, Table I, which shows the percent of threats detected for this example.

Figure 12:
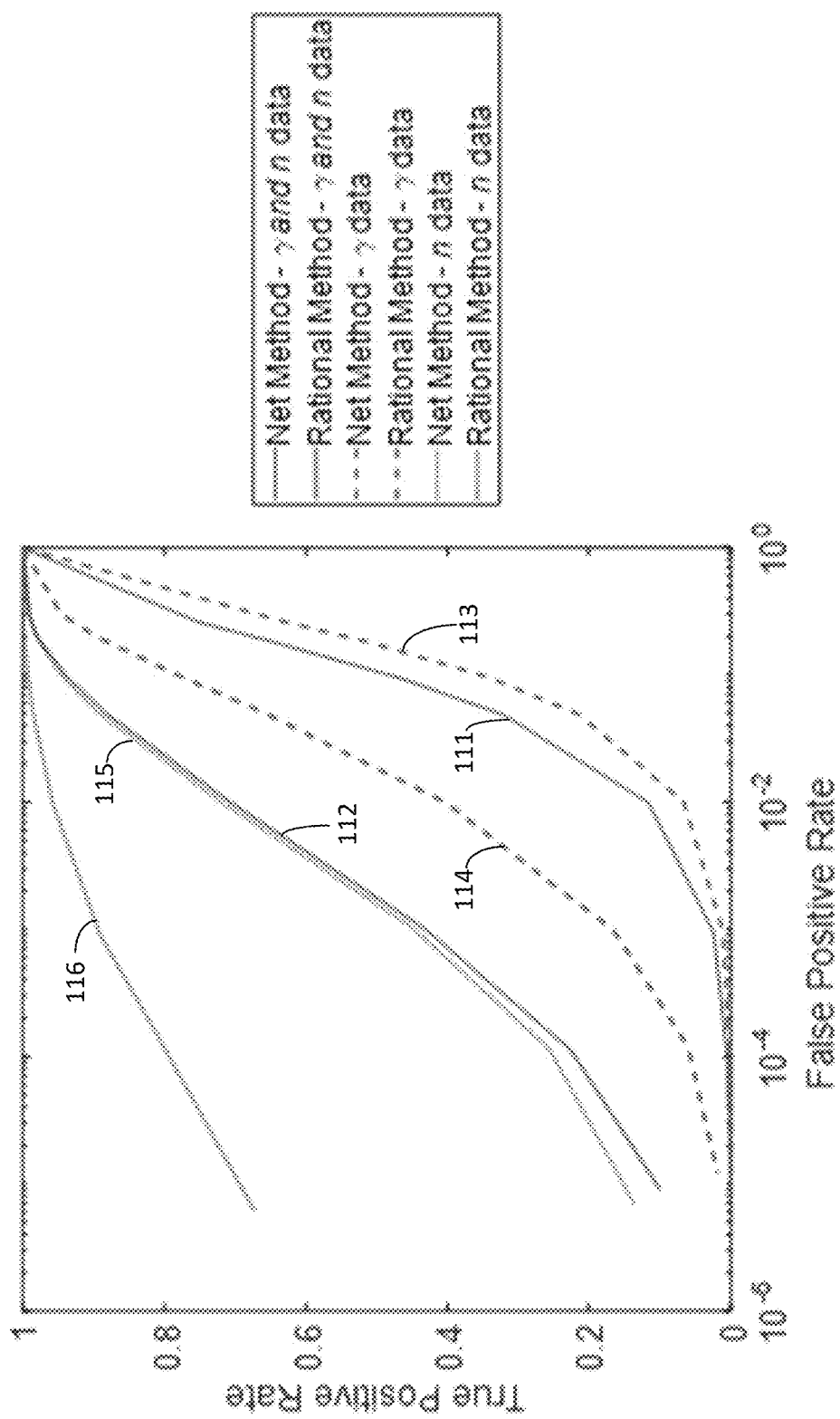
FIG. 12 is an experimental measurement comparison plot of methods at 400 cm distance to detector at the apex and a 1 s time interval using combined data.

The results in the table also indicate that for scenarios where source counts are low, the Fit Methods better predict the presence of a source. However, measure of variance is needed to truly compare the detection methods. FIG. 12 shows how the signal to background ratio affects the ROC curve and therefore the ability to correctly predict the presence of a source. At 700 cm, the signal to background ratio is 1.58, 1.23 and 1.78 for combined data, gamma-ray only data, and neutron only data, respectively. Curves 111-116 correspond, respectively, to the Net Method for combined data, the Rational Method for combined data, the Net Method for gamma-ray only data, the Rational Method for gamma-ray only data, the Net Method for neutron only data and the Rational Method for neutron only data.

The ROC curves with higher signal to background ratios are closer to the top of the ROC space, which is desirable. This is most noticeable at greater distances from the detector at the apex. The data at a source to detector distance at the apex of 700 cm shows significant variations when comparing particle type; the gamma-ray only data being the worst and the neutron only data being the best. The AUC values using the Net Signal Method at 700 cm are 0.77, 0.70 and 0.98 for the combined data, gamma-ray only data and neutron only data, respectively. These values indicate the signal to background ratio plays a significant role in the ability of all of the methods to correctly classify the presence or absence of a radioactive source. A higher signal to background ratio leads to better classification capabilities.

Tables II and III shown in FIGS. 13 and 14, respectively, show the percent of threats detected for the same scenario as described for Table I. Results were based on a person that walked at the average human pace, 1.4 m/s; the apex of his walk was at 300 cm, 500 cm and 700 cm; and the system detection threshold was set to have a false positive rate of 0.01%.

The neutron only data in Table II shows a significant improvement in detection ability at further distances for all methods when compared to the gamma-ray only data in Table III. The gamma-ray only data is significantly worse for detecting the presence of source at further distances. The Net Signal Method remains the worst of the three methods. Although neutron and gamma count rates were comparable, the neutron background rate is significantly lower explaining the difference in performance and highlighting the importance of signal-to-noise ratio.

Experimental Data

Figure 15:
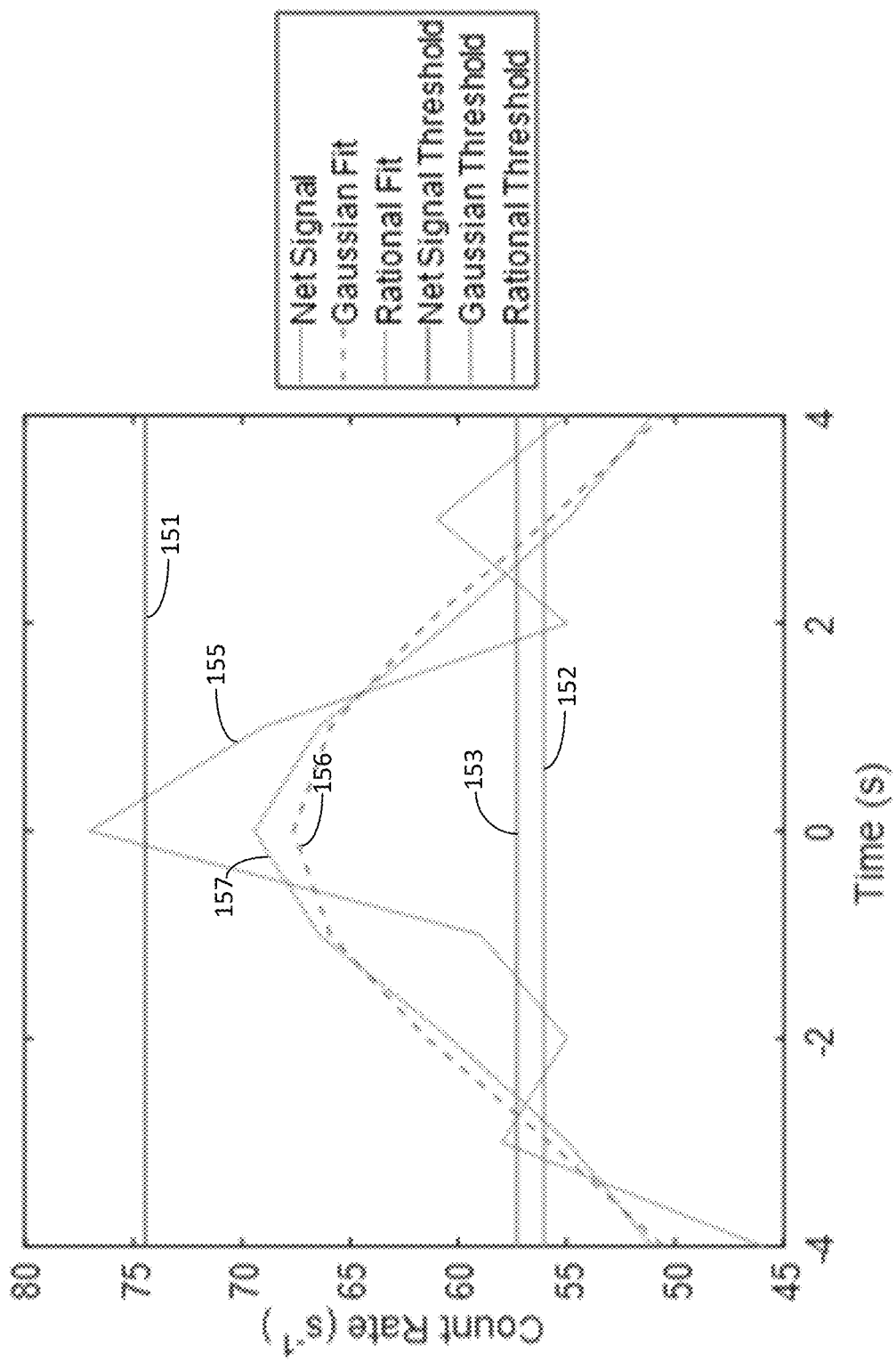
FIG. 15 shows experimental measurement results in terms of count rate as a function of time.

Each of the methods correctly predicted the presence of a radiological source in all four of the experimental measurements (100 cm, 200 cm, 300 cm and 400 cm) independent of the time interval setting. FIG. 15 shows the results in terms of count rate as a function of time for the experimental combined data. Lines 151, 152 and 153 represent the Net Signal threshold, the Rational threshold and the Gaussian threshold, respectively. Curves 155, 156 and 157 are the Net signal, the Gaussian Fit and the Rational Fit curves, respectively.

For a maximum of 400 cm source to detector distance at the apex, limited by the size of the laboratory, all experimental measurements were able to be detected. The length of the room also restricted the duration of the person's walk and the furthest distance from the detector at the beginning and ends of the walk. The source carrier was not able to get far enough away from the detector at the beginning and end of his walk to allow the count rate to drop within background for any significant length of time. This affects the shape (amplitude and width) of the fit functions.

System Setup

In accordance with a representative embodiment, the general measurement setup scenario involves the detection of moving radioactive sources by a stationary detection system. The setup for the system can comprise a single radiological detector and a single 3-D vision sensor. This works well in a laboratory space, but in the real world, more complex and uncontrolled environments can be presented. A system more capable of handling those types of environments would typically include multiple 3-D vision sensors and radiological detectors. Sensors would typically be setup to view as much of the scene as possible. It is desirable for the radiological detectors to be setup strategically in places that complement one another, especially for scenarios with visual occlusions present. A further consideration is wall-effects and impacts of radiation scatter on detected count rates. A more complex system setup may involve, for example, the Velodyne HDL-32E vision sensor and several radiological detectors. Normally, one radiological detector is set to be co-located with the vision sensor. Remaining detectors preferably are dispersed around the space in a way that crudely optimizes coverage.

Data-Fusion Algorithm

The data-fusion algorithm discussed in this section is termed the Cosine Distance Method. It should be noted, however, that other data-fusion algorithms may be used for this purpose, as will be understood by persons of skill in the art in view of the description provided herein. The Cosine Distance Method takes the cosine angle between two vectors (one vision trajectory and one radiological trajectory) to measure the similarity. The equation for the Cosine Distance Method is shown in Eq. 3, $$\text{cosine}(A, B) = \frac{A \cdot B}{|A| \times |B|}. \tag{3}$$

The variables A and B are vectors of the same length, A·B is the dot product between vectors, and |A| and |B| are the magnitudes of A and B, respectively. Each vision trajectory (1-D distance data over time) created by the Kalman filter is compared to the radiological trajectory (1-D distance converted count rate) using this method. For the Cosine Distance Method, a value of one means the vectors have the same orientation. Thus, the trajectory with a correlation value closest to one is selected by the algorithm to be the person carrying the radioactive material. Two additional data-fusion algorithms for correlating the trajectories from both types of sensors were investigated: The Correlation Coefficient Method and the Noise Deviation Method. The results from these methods showed similar results to the results obtained using the Cosine Distance Method.

If a tracked object becomes occluded from the vision sensor, a Kalman filter may be applied to predict the object's location based on the object's last known direction and velocity. When the object is no longer occluded, the Kalman filter tracks the object more accurately again; however, the location of the object when it is no longer occluded is not always the same as the Kalman filter prediction.

Unknown Number of Sources

It is desirable to have a data-fusion algorithm that is sufficiently robust to detect and track any number of sources. Data-fusion algorithms that do not assume the number of sources present or the lack of a source present will now be explored.

The Cosine Distance Method discussed above, on its own, is insufficient for scenarios with multiple sources. When multiple sources are present, the count rate collected by each of the radiological detectors is the combination of the sources present. Thus, when multiple sources are present, the distance converted count rate, or radiological trajectory, will not look similar to any of the vision trajectories as it does for single source scenarios. Thus, two methods for a data-fusion correlation algorithm are examined in this section.

In order to apply the same Cosine Distance Method and differentiate between which trajectories are carrying sources and which trajectories are not, a Voronoi diagram is implemented. A Voronoi diagram is a partitioning of a plane into regions based on distance to points (or seeds) in a specific subset of the plane. That set of seeds is specified beforehand, and for each seed there is a corresponding region consisting of all points closer to that seed than to any other. These regions are called Voronoi cells. For the present application, the seeds are the detectors. Given the use of four detectors (Detectors 2, 3, 4 and 5), there are four Voronoi cells. When a tracked object enters a given Voronoi cell, the count rate data will be used from the detector corresponding to that cell. This method creates a piecewise vision trajectory and a piecewise radiological trajectory for each tracked object. This is unlike the previous single-source measurement considerations when a single radiological trajectory from a single detector can be compared to all of the vision trajectories from the tracked objects.

Figure 16:
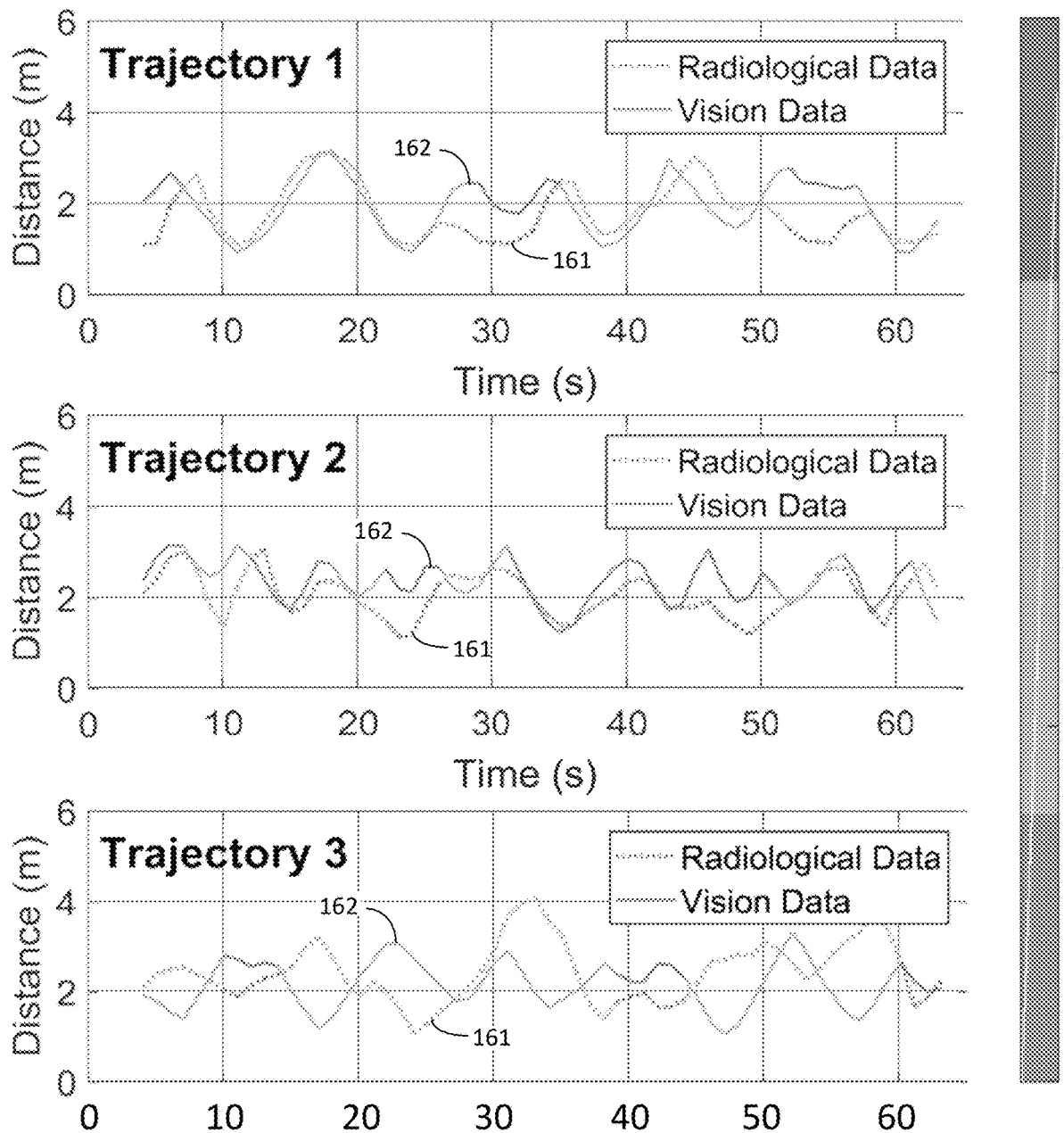
FIG. 16 shows an example of the trajectories with implemented Voronoi diagram radiological and vision trajectories for three tracked objects in NSC 227 using EJ-309 liquid scintillators.

FIG. 16 shows an example of the trajectories with the implemented Voronoi diagram radiological and vision trajectories for three tracked objects in NSC 227 using EJ-309 liquid scintillator detectors. In FIG. 16, the dashed-line plots 161 correspond to the radiological data and the solid-line plots 162 correspond to the vision data. With the Voronoi diagram implementation, each tracked object's vision trajectory is correlated to its own unique piecewise radiological trajectory. FIG. 16 shows how the Voronoi diagram creates vision trajectory and radiological trajectory pairs for each individual being tracked. Each color represents a different detector or Voronoi cell. Thus, the chosen color/detector in the trajectory corresponds to the one that the individual was closest to at that time. The Voronoi diagram implementation allows the Cosine Distance Method to be applied to each pair.

Figure 17A:
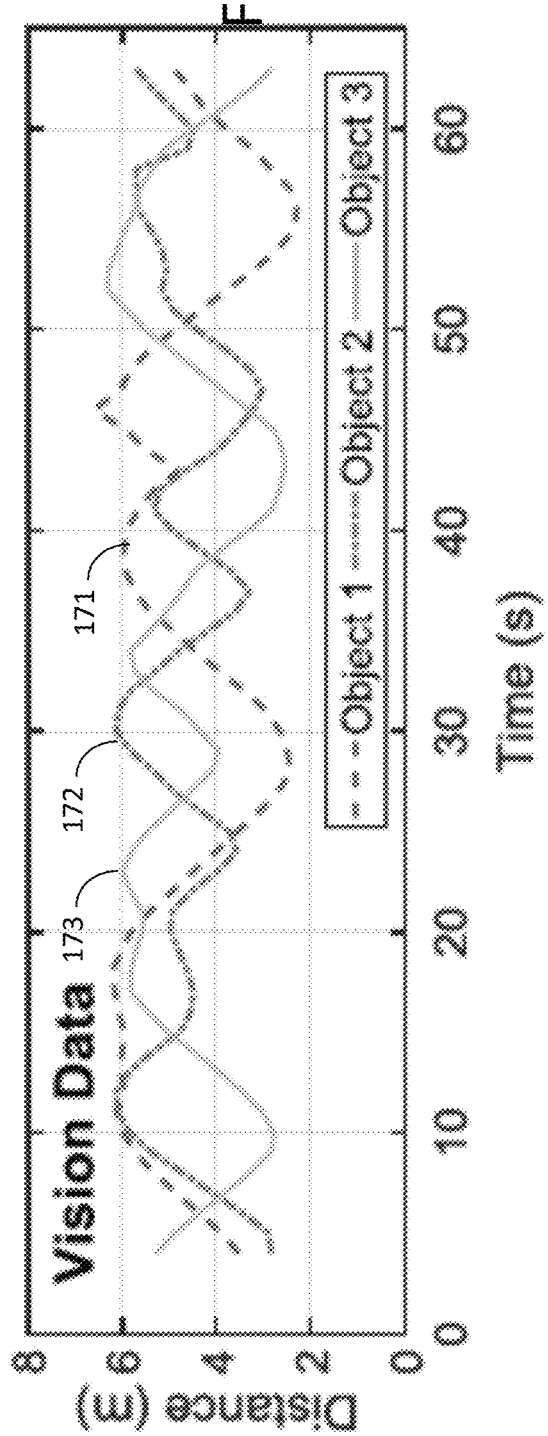
FIGS. 17A and 17B are plots of distance from apex as a function of time for vision and radiological trajectories for NNLS Method for the three tracked objects in NSC 227.
Figure 17B:
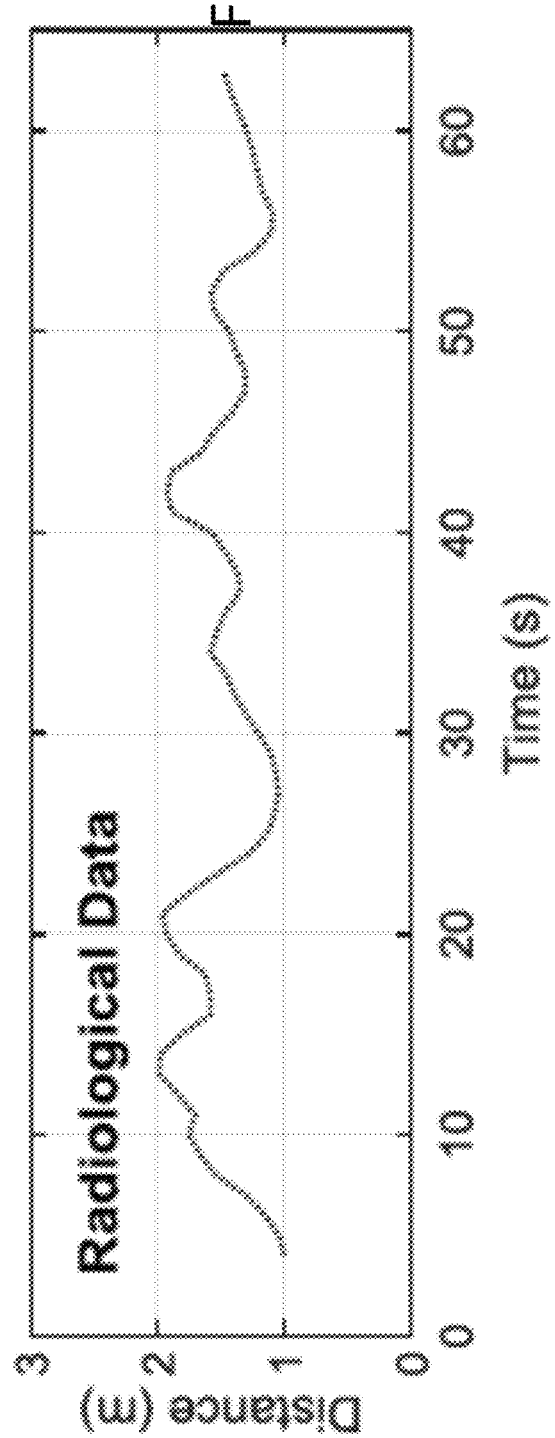

Another method used for comparison is the Non-negative Least Squares (NNLS) Method. FIGS. 17A and 17B are plots of distance from the apex as a function of time for vision and radiological trajectories, respectively, for the NNLS Method for three tracked objects in NSC 227 using EJ-309 liquid scintillators for a multi-source scenario. Curves 171, 172 and 173 correspond to the vision trajectories for the first, second and third objects, respectively. Curve 174 corresponds to the radiological trajectory.

The NNLS Method uses a single radiological detector, and it does not use the Voronoi diagram. The NNLS Method is a constrained least squares problem where the coefficients are not allowed to be negative. It assigns weights to each vision trajectory that could possibly contribute to the radiological trajectory. The greater the weight assigned to a given object's vision trajectory, the more likely the object is to be carrying a source. For purposes of this discussion, the assigned weights are simply called the correlation values. The idea is to minimize Eq. 4 subject to $x \geq 0$, $$NNLS(A,B) = \min \|Ax - B\|, \quad (4)$$

where A is the matrix of vision trajectories and B is the radiological trajectory vector. The parameter x is the vector that minimizes Eq. 4. Thus, each vision trajectory is given a weight in x. The weights (or correlation values) are expected to be greater for trajectories containing sources. In measurements with multiple sources, the trajectories containing sources are expected to have similar weight values. However, if the sources are of significantly different strengths, the stronger source is likely to have a higher correlation value, while the weaker source would have a lower correlation value but would ideally have a notably higher correlation value than no source trajectories.

Figure 18:
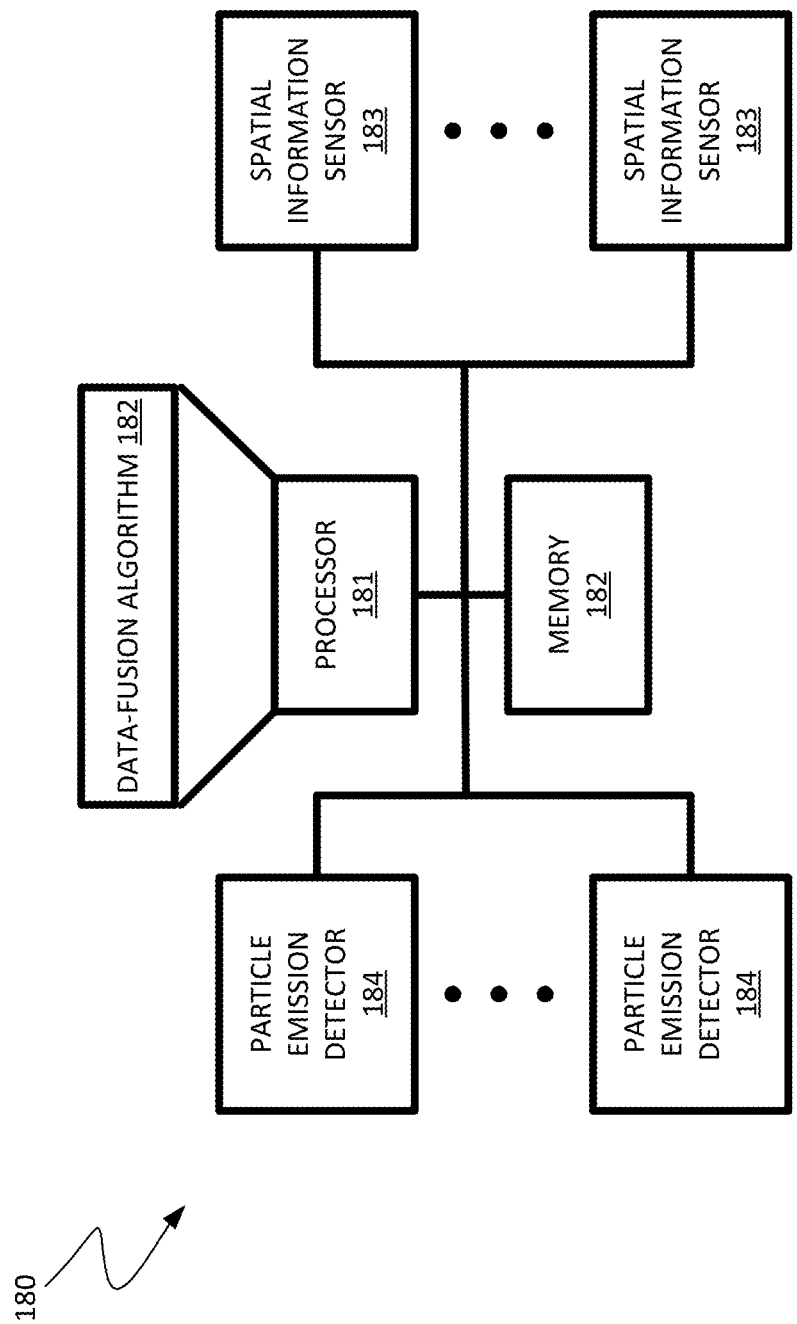

FIG. 18 is a block diagram of the system 180 in accordance with a representative embodiment for detecting particle emissions, such as radiological emissions from a radiological source, for example. A processor 181 of the system 180 is configured to perform the data-fusion algorithm 182, which, in accordance with a preferred embodiment, comprises a correlation algorithm and a detection algorithm. The data-fusion algorithm 182 can be implemented in hardware, software, firmware, or a combination thereof. The algorithm is typically implemented as one or more computer software programs implemented executed by the processor 181. A memory device 183 of the system 180 is used for storing the computer instructions comprising the program 182 and may also be used for storing data.

The system 180 comprises M spatial information sensors 183 and N particle emission detectors 184, where M and N are positive integers that are greater than or equal to one, and where M and N may or may not be equal. In accordance with the representative embodiments described above, the particle emission detector(s) 184 are radiological detector(s) and the spatial information sensor(s) 183 are 3-D vision sensor(s).

Figure 19:
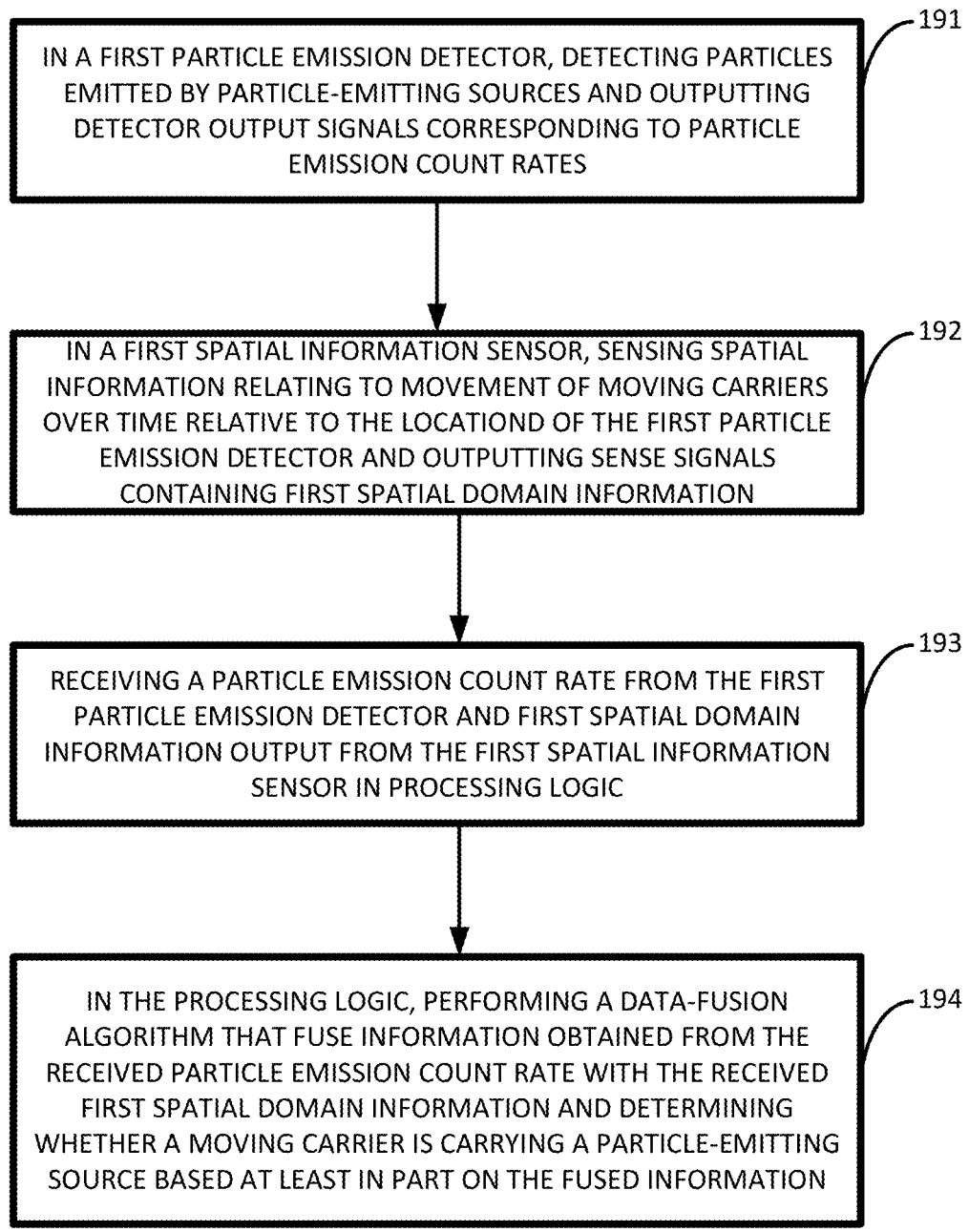
FIG. 19 is a block diagram of the system in accordance with a representative embodiment for detecting particle emissions.

FIG. 19 is a flow diagram representing the method performed by the system in accordance with a representative embodiment for detecting sources of particle emissions, such as radiological emissions, for example. Block 191 represents the step of using at least a first particle emission detector to detect particles emitted by particle-emitting sources and outputting detector output signals corresponding to particle emission count rates. Block 192 represents the step of using at least a first spatial information sensor to senses spatial information relating to movement of moving carriers over time relative to a location of the first particle emission detector and outputting sense signals containing first spatial domain information. Block 193 represents the step of receiving a particle emission count rate output from the particle emission detector and the first spatial domain information output by the first spatial information sensor in processing logic. Block 194 represents the step of the processing logic performing a data-fusion algorithm that fuses information obtained from the received particle emission count rate with the received first spatial domain information and determining whether a moving carrier is carrying a particle-emitting source based at least in part on the fused information.

It should be noted that any or all portions of algorithms described above that are implemented in software and/or firmware being executed by a processor (e.g., processor 181) can be stored in a non-transitory memory device, such as the memory 182. For any component discussed herein that is implemented in the form of software, any one of a number of programming languages may be employed such as, for example, C, C++, C#, Objective C, JavaR, JavaScript", Perl, PHP, Visual Basic", PythonR, Ruby, Flash®, or other programming languages. The term "executable" means a program file that is in a form that can ultimately be run by the processor 181. Examples of executable programs may be, for example, a compiled program that can be translated into machine code in a format that can be loaded into a random access portion of the memory 182 and run by the processor 181, source code that may be expressed in proper format such as object code that is capable of being loaded into a random access portion of the memory 182 and executed by the processor 181, or source code that may be interpreted by another executable program to generate instructions in a random access portion of the memory 182 to be executed by the processor 181, etc. An executable program may be stored in any portion or component of the memory 182 including, for example, random access memory (RAM), read-only memory (ROM), hard drive, solid-state drive, USB flash drive, memory card, optical disc such as compact disc (CD) or digital versatile disc (DVD), floppy disk, magnetic tape, static random access memory (SRAM), dynamic random access memory (DRAM), magnetic random access memory (MRAM), a programmable read-only memory (PROM), an erasable programmable read-only memory (EPROM), an electrically erasable programmable read-only memory (EEPROM), or other like memory device.

CONCLUSIONS

At closer distances to the detector, or alternatively for relatively strong sources, all of the methods discussed above are able to correctly classify the presence or absence of a radioactive source. However, in challenging detection scenarios, the Fit Methods provide the most accurate predictiveness. The time interval only significantly affects the Net Signal Method. A higher time interval reduces statistical noise, but a time interval that is too high begins to reduce the signal to background ratio. For all of the methods, a higher signal to background ratio resulted in significant improvements in the ability of the method to predict the presence of a source. Even slight improvements in the signal to background ratio show better results. The revised detection threshold determination resulted in drastic improvements. These results are significant and can impact the time and money spent on responding to false alarms in an implemented system.

In general, the ROC curves show the trade-off between false positive rate and true positive rate. The signal to background ratio can be a useful indicator for determining a detection threshold. Scenarios where the source carrier does not move in a straight path can still be fit, but work needs to be performed and examined using this revision. In these cases, the vision data will aid in determining the path. The appropriate fit function and parameters can then be determined.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A system for detecting sources of particle emissions, the system comprising:
at least a first particle emission detector that detects particles emitted by particle-emitting sources and outputs detector output signals corresponding to particle emission count rates;
at least a first spatial information sensor that senses spatial information relating to movement of moving carriers over time relative to a location of the first particle emission detector and outputs sense signals containing first spatial domain information; and
processing logic that receives a particle emission count rate and the first spatial domain information, the processing logic being configured to perform a data-fusion algorithm that fuses information obtained from the particle emission count rate with the first spatial domain information and determines whether a moving carrier is carrying a particle-emitting source based at least in part on the fused information, where the information obtained from the particle emission count rate comprises second spatial domain information obtained by the data-fusion algorithm by converting the received particle emission count rate into the second spatial domain information, and where the data-fusion algorithm comprises a correlation algorithm and a detection algorithm, the correlation algorithm correlating the first spatial domain information with the second spatial domain information to determine whether the moving carrier correlates to the particle emission count rate, the detection algorithm determining whether the received particle emission count rate indicates that a particle-emitting source has been detected by the detection algorithm.

2. The system of claim 1, wherein the first particle emission detector is a first radiation detector that detects radiation emitted by radiological sources and outputs radiation count rates, the particle-emitting sources being radiological sources, the data-fusion algorithm converting the received radiation count rate into said second spatial domain information.

3. The system of claim 1, wherein the first spatial information sensor comprises a first three-dimensional (3-D) sensor that detects a distance of the moving carrier over time relative to the location of the first particle emission detector, the first spatial domain information comprising the distance of the moving carrier over time relative to the location of the first particle emission detector, the second spatial domain information comprising a distance of the moving carrier over time relative to the location of the first particle emission detector.

4. The system of claim 1, wherein the correlation algorithm uses a correlation threshold (TH) value to determine an extent of correlation between the first and second spatial domain information, and wherein the detection algorithm uses a detection limit TH value to determine whether the received particle emission count rate indicates that a particle-emitting source has been detected by the detection algorithm.

5. The system of claim 4, wherein the detection algorithm operates to provide a primary alarm and the correlation algorithm operates to provide a secondary alarm such that if the detection algorithm determines that the received particle emission count rate has exceeded the detection limit TH value thereby indicating that the received particle emission count rate indicates that a particle-emitting source has been detected, the primary alarm occurs, and such that when the primary alarm occurs, the correlation algorithm determines which moving carrier has a highest correlation to the particle emission count rate that exceeded the detection limit TH value and causes the secondary alarm to occur.

6. The system of claim 5, wherein the correlation algorithm is selected from a group comprising a Cosine Distance Method algorithm, a Correlation Coefficient Method algorithm, a Noise Deviation Method algorithm and a Non-negative Least Squares (NNLS) Method algorithm.

7. The system of claim 5, wherein the detection limit TH value is set based at least in part on a preselected false positive rate that the system is to achieve.

8. The system of claim 5, wherein the detection algorithm sets the detection limit TH value by performing a fit algorithm that fits a preselected curve function to a multiplicity of the detector output signals to obtain a multiplicity of fits and then sets the detection limit TH value based on the multiplicity of fits.

9. The system of claim 8, wherein after the detection limit TH value is set by performing the fit algorithm, the detection algorithm determines whether the particle emission count rate has exceeded the detection limit TH value thereby indicating that a particle-emitting source has been detected and causing the primary alarm to occur.

10. The system of claim 9, wherein after the detection algorithm sets the detection limit TH value, the detection algorithm revises the detection limit TH value by performing the fit algorithm on a multiplicity of the detector output signals to obtain a multiplicity of fits and then revises the detection limit TH value based on the multiplicity of fits.

11. The system of claim 10, wherein the fit algorithm is selected from a group comprising a Gaussian Fit Method algorithm and a Rational Fit Method algorithm.

12. The system of claim 1, further comprising:
at least a second particle emission detector that detects particles emitted by particle-emitting sources and outputs detector output signals corresponding to particle emission count rates; and
at least a second spatial information sensor located in a preselected location relative to the first particle emission detector and the first spatial information sensor, the second spatial information sensor sensing spatial information relating to movement of moving carriers over time relative to the location of the first particle emission detector and outputs sense signals containing the first spatial domain information, and wherein the processing logic receives particle emission count rates output by the first and second particle emission detectors and the first spatial domain information output by the first and second spatial information sensors and fuses information obtained from the particle emission count rates with the first spatial domain information and determines whether a first moving carrier or a second moving carrier is carrying a particle-emitting source based at least in part on the fused information.

13. A method for detecting sources of particle emissions, the method comprising:
with at least a first particle emission detector, detecting particles emitted by particle-emitting sources and outputting detector output signals corresponding to particle emission count rates;
with at least a first spatial information sensor that senses spatial information relating to movement of moving carriers over time relative to a location of the first particle emission detector and outputting sense signals containing first spatial domain information;
receiving a particle emission count rate and the first spatial domain information in processing logic; and
in the processing logic, performing a data-fusion algorithm that fuses information obtained from the received particle emission count rate with the received first spatial domain information and determining whether a moving carrier is carrying a particle-emitting source based at least in part on the fused information, where the information obtained from the particle emission count rate comprises second spatial domain information obtained by the data-fusion algorithm by converting the received particle emission count rate into second spatial domain information, and where the data-fusion algorithm comprises a correlation algorithm and a detection algorithm, the correlation algorithm correlating the first spatial domain information with the second spatial domain information to determine whether the moving carrier correlates to the particle emission count rate, the detection algorithm determining whether the received particle emission count rate indicates that a particle-emitting source has been detected by the detection algorithm.

14. The method of claim 13, wherein the first particle emission detector is a first radiation detector that detects radiation emitted by radiological sources and outputs radiation count rates, the particle-emitting sources being radiological sources, the data-fusion algorithm converting the received radiation count rate into said second spatial domain information.

15. The method of claim 13, wherein the first spatial information sensor comprises a first three-dimensional (3-D) sensor that detects a distance of the moving carrier over time relative to the location of the first particle emission detector, the first spatial domain information comprising the distance of the moving carrier over time relative to the location of the first particle emission detector, the second spatial domain information comprising a distance of the moving carrier over time relative to the location of the first particle emission detector.

16. The method of claim 13, wherein the correlation algorithm uses a correlation threshold (TH) value to determine an extent of correlation between the first and second spatial domain information, and wherein the detection algorithm uses a detection limit TH value to determine whether the received particle emission count rate indicates that a particle-emitting source has been detected by the detection algorithm.

17. The method of claim 16, wherein the detection algorithm sets the detection limit TH value by performing a fit algorithm that fits a preselected curve function to a multiplicity of the detector output signals to obtain a multiplicity of fits and then sets the detection limit TH value based on the multiplicity of fits, wherein after the detection limit TH value is set by performing the fit algorithm, the detection algorithm determines whether the particle emission count rate has exceeded the detection limit TH value thereby indicating that a particle-emitting source has been detected, and if so, causes the primary alarm to occur, wherein after the detection algorithm sets the detection limit TH value, the detection algorithm revises the detection limit TH value by performing the fit algorithm on a multiplicity of the detector output signals to obtain a multiplicity of fits and then revises the detection limit TH value based on the multiplicity of fits.

18. A nontransitory computer readable medium comprising a computer program for detecting sources of particle emissions, the computer program being embodied on the nontransitory computer readable medium and comprising computer instructions for execution by processing logic, the computer program comprising:
- a first computer code portion that receives a particle emission count rate from at least a particle emission detector that detects particles emitted by particle-emitting sources and outputs detector output signals corresponding to particle emission count rates;
- a second computer code portion that receives first spatial domain information from at least a first spatial information sensor that senses spatial information relating to movement of moving carriers over time relative to a location of the first particle emission detector and outputs sense signals containing the first spatial domain information; and
- a third computer code portion that performs a data-fusion algorithm that fuses information obtained from the particle emission count rate received by the first computer code portion with the first spatial domain information received by the second computer code portion and determines whether a moving carrier is carrying a particle-emitting source based at least in part on the fused information, where the information obtained from the particle emission count rate comprises second spatial domain information obtained by the data-fusion algorithm by converting the received particle emission count rate into second spatial domain information, and where the data-fusion algorithm comprises a correlation algorithm and a detection algorithm, the correlation algorithm correlating the first spatial domain information with the second spatial domain information to determine whether the moving carrier correlates to the particle emission count rate, the detection algorithm determining whether the received particle emission count rate indicates that a particle-emitting source has been detected by the detection algorithm.

19. The nontransitory computer readable medium of claim 18, wherein the first particle emission detector is a first radiation detector that detects radiation emitted by radiological sources and outputs radiation count rates, the particle-emitting sources being radiological sources, the data-fusion algorithm converting the received radiation count rate into said second spatial domain information.

20. The nontransitory computer readable medium of claim 18, wherein the correlation algorithm uses a correlation threshold (TH) value to determine an extent of correlation between the first and second spatial domain information, and wherein the detection algorithm uses a detection limit TH value to determine whether the received particle emission count rate indicates that a particle-emitting source has been detected by the detection algorithm.

* * * * *